US010200841B2

(12) United States Patent
Buckley et al.

(10) Patent No.: US 10,200,841 B2
(45) Date of Patent: Feb. 5, 2019

(54) OPTIMIZED SHORT MESSAGE TRANSPORT

(71) Applicant: BlackBerry Limited, Waterloo (CA)

(72) Inventors: Adrian Buckley, Tracy, CA (US); Jan Hendrik Lucas Bakker, Keller, TX (US); Nicholas James Russell, Newbury (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/679,927

(22) Filed: Aug. 17, 2017

(65) Prior Publication Data
US 2017/0347225 A1 Nov. 30, 2017

Related U.S. Application Data

(63) Continuation of application No. 14/834,216, filed on Aug. 24, 2015, now Pat. No. 9,769,592.

(51) Int. Cl.
H04W 4/00 (2018.01)
H04W 4/70 (2018.01)
H04W 4/14 (2009.01)
H04W 8/00 (2009.01)
H04W 4/20 (2018.01)
H04W 60/00 (2009.01)
H04W 60/02 (2009.01)
G01D 4/00 (2006.01)
H04W 8/06 (2009.01)

(52) U.S. Cl.
CPC ............ H04W 4/70 (2018.02); H04W 4/14 (2013.01); H04W 4/20 (2013.01); H04W 8/005 (2013.01); H04W 60/00 (2013.01); H04W 60/02 (2013.01); G01D 4/002 (2013.01); H04W 8/06 (2013.01)

(58) Field of Classification Search
CPC ........ H04W 4/005; H04W 4/14; H04W 4/20; H04W 8/005; G01D 4/002
USPC ...................................... 455/435.1
See application file for complete search history.

(56) References Cited

U.S. PATENT DOCUMENTS

2011/0085535 A1* 4/2011 Shaheen ............. H04L 51/38
370/338
2013/0080597 A1* 3/2013 Liao .................. H04W 4/005
709/219

(Continued)

FOREIGN PATENT DOCUMENTS

EP 2615421 7/2013
WO 2013/051826 4/2013

OTHER PUBLICATIONS

3GPP TR 23.720 V 0.1.0, Jul. 2015.*
(Continued)

Primary Examiner — William Nealon
(74) Attorney, Agent, or Firm — Fish & Richardson P.C.

(57) ABSTRACT

A method for transferring data using optimized short message transport includes receiving at a first network node an attach request message. The attach request message includes short-message data. The first network node receives from a second network node a short-message data response message. The short-message data response message includes at least one of an address for a short message service center, an indication that indicates no mobile-terminated message is pending for the UE, or a short-message entity destination address.

23 Claims, 51 Drawing Sheets

(56) References Cited

U.S. PATENT DOCUMENTS

| | | | | |
|---|---|---|---|---|
| 2013/0083726 A1* | 4/2013 | Jain | .................. | H04W 28/0215 |
| | | | | 370/328 |
| 2013/0268604 A1* | 10/2013 | Gupta | ................... | H04W 60/04 |
| | | | | 709/206 |
| 2014/0004890 A1* | 1/2014 | Cai | ........................ | H04L 67/24 |
| | | | | 455/466 |
| 2014/0241241 A1* | 8/2014 | Liu | ........................ | H04W 4/14 |
| | | | | 370/328 |
| 2015/0109966 A1* | 4/2015 | Hong | ..................... | H04W 4/14 |
| | | | | 370/259 |
| 2017/0048112 A1* | 2/2017 | Ronneke | ................ | H04L 41/12 |
| 2017/0048684 A1* | 2/2017 | Ronneke et al. | ....... | H04W 4/14 |

OTHER PUBLICATIONS

3GPP TS23.040 V12.2.0, Dec. 2013.
3GPP TS23.060 V9.3.0, Dec. 2009.
3GPP TR 23.888; "3rd Generation Partnership Project; Technical Specification Group Services and System Aspects; System Improvements for Machine-Type Communications (MTC); Release 11"; vol. SA WG2, No. V11.0.0; Sep. 18, 2012; pp. 1-165.
3GPP TR 23.720; "3rd Generation Partnership Project; Technical Specification Group Services and System Aspects; Study on Architecture Enhancements for Cellular Internet of Things; Release 13"; vol. SA WG2, No. V13.0.0; Mar. 15, 2016; pp. 1-94.
International Search Report and Written Opinion of the International Searching Authority issued in International Application PCT/EP2016/069692 dated Dec. 22, 2016.

* cited by examiner

5.5    EMM specific procedures
5.5.1 Attach procedure
5.5.1.1 General
The attach procedure is used to attach to an EPC for packet services in EPS.
The attach procedure is used for three purposes:
  - by a UE in PS mode of operation to attach for EPS services only;
  - by a UE to attach for CIoT services;
  - by a UE in CS/PS mode 1 or CS/PS mode 2 of operation to attach for both EPS and non-EPS services; or
  - to attach for emergency bearer services.

The lower layers indicate to NAS that the network does not support emergency bearer services for the UE in limited service state (3GPP TS 36.331 [22]). This information is taken into account when deciding whether to initiate attach for emergency bearer services.
If the MME does not support an attach for emergency bearer services, the MME shall reject any request to attach with an attach type set to "EPS emergency attach".
With a successful attach procedure, a context is established for the UE in the MME, and a default bearer is established between the UE and the PDN GW, thus enabling always-on IP connectivity to the UE. The network may also initiate the activation of dedicated bearers as part of the attach procedure.
During the attach procedure, the UE may also obtain the home agent IPv4 or IPv6 address or both.
In a shared network, the UE shall choose one of the PLMN identities as specified in 3GPP TS 23.122 [6]. The UE shall construct the TAI of the cell from this chosen PLMN identity and the TAC received as part of the broadcast system information. The chosen PLMN identity shall be indicated to the E-UTRAN (see 3GPP TS 36.331 [22]). Whenever an ATTACH REJECT message with the EMM cause #11 "PLMN not allowed" is received by the UE, the chosen PLMN identity shall be stored in the "forbidden PLMN list". Whenever an ATTACH REJECT message with the EMM cause #14 "EPS services not allowed in this PLMN" is received by the UE, the chosen PLMN identity shall be stored in the "forbidden PLMNs for GPRS service". Whenever an ATTACH REJECT message is received by the UE with the EMM cause #12 "tracking area not allowed", #13 "roaming not allowed in this tracking area", or #15 "no suitable cells in tracking area", the constructed TAI shall be stored in the suitable list.
An attach attempt counter is used to limit the number of subsequently rejected attach attempts. The attach attempt counter shall be incremented as specified in subclause 5.5.1.2.6. Depending on the value of the attach attempt counter, specific actions shall be performed. The attach attempt counter shall be reset when:
  - the UE is powered on;
  - a USIM is inserted;
  - an attach or combined attach procedure is successfully completed;
  - a GPRS attach or combined GPRS attach procedure is successfully completed in A/Gb or Iu mode;

1600 \
FROM FIG. 16A

- a combined attach procedure is completed for EPS services only with cause #2, #16, #17, #18 or #22;

- an attach or combined attach procedure is rejected with cause #11, #12, #13, #14, #15, #25 or #35;

- a network initiated detach procedure is completed with cause #11, #12, #13, #14, #15 or #25; or

- a new PLMN is selected.

Additionally the attach attempt counter shall be reset when the UE is in substate EMM-DEREGISTERED.ATTEMPTING-TO-ATTACH and:

- a new tracking area is entered;

- timer T3402 expires; or

- timer T3346 is started.

5.5.1.2 Attach procedure for CIoT and EPS services 5.5.1.2.1    General

This procedure is used by a UE to attach for EPS services only. When the UE initiates the attach procedure, for normal service the UE shall indicate "EPS attach" in the EPS attach type IE.

When the UE initiates the attach procedure for emergency bearer services, the UE shall indicate "EPS emergency attach" in the EPS attach type IE.

5.5.1.2.2    Attach procedure initiation

In state EMM-DEREGISTERED, the UE initiates the attach procedure by sending an ATTACH REQUEST message to the MME, starting timer T3410 and entering state EMM-REGISTERED-INITIATED (see example in figure 5.5.1.2.2.1). If timer T3402 is currently running, the UE shall stop timer T3402. If timer T3411 is currently running, the UE shall stop timer T3411.

If the UE is configured for "AttachWithIMSI" as specified in 3GPP TS 24.368 [15A] or 3GPP TS 31.102 [17] and the selected PLMN is neither the registered PLMN nor in the list of equivalent PLMNs, the UE shall include the IMSI in the EPS mobile identity IE in the ATTACH REQUEST message.

For all other cases, the UE shall handle the EPS mobile identity IE in the ATTACH REQUEST message as follows:

- If the UE supports neither A/Gb mode nor Iu mode:

1600 \
FROM FIG. 16B

⋮

- the UE shall include in the ATTACH REQUEST message a valid GUTI together with the last visited registered TAI, if available. In addition, the UE shall include Old GUTI type IE with GUTI type set to "native GUTI". If there is no valid GUTI available, the UE shall include the IMSI in the ATTACH REQUEST message.

If the UE supports A/Gb mode or Iu mode or both:

- if the TIN indicates "P-TMSI" and the UE holds a valid P-TMSI and RAI, the UE shall map the P-TMSI and RAI into the EPS mobile identity IE, and include Old GUTI type IE with GUTI type set to "mapped GUTI". If a P-TMSI signature is associated with the P-TMSI, the UE shall include it in the Old P-TMSI signature IE. Additionally, if the UE holds a valid GUTI, the UE shall indicate the GUTI in the Additional GUTI IE.

NOTE: The mapping of the P-TMSI and the RAI to the GUTI is specified in 3GPP TS 23.003 [2].

- If the TIN indicates "GUTI" or "RAT-related TMSI" and the UE holds a valid GUTI, the UE shall indicate the GUTI in the EPS mobile identity IE, and include Old GUTI type IE with GUTI type set to "native GUTI".

- If the TIN is deleted and

- the UE holds a valid GUTI, the UE shall indicate the GUTI in the EPS mobile identity IE, and include Old GUTI type IE with GUTI type set to "native GUTI";

- the UE does not hold a valid GUTI but holds a valid P-TMSI and RAI, the UE shall map the P-TMSI and RAI into the EPS mobile identity IE, and include Old GUTI type IE with GUTI type set to "mapped GUTI". If a P-TMSI signature is associated with the P-TMSI, the UE shall include it in the Old P-TMSI signature IE; or

- the UE does not hold a valid GUTI, P-TMSI or RAI, the UE shall include the IMSI in the EPS mobile identity IE.

- Otherwise the UE shall include the IMSI in the EPS mobile identity IE.

If the UE is attaching for emergency bearer services and does not hold a valid GUTI, P-TMSI or IMSI as described above, the IMEI shall be included in the EPS mobile identity IE.

If the UE supports A/Gb mode or Iu mode or if the UE needs to indicate its UE specific DRX parameter to the network, the UE shall include the UE specific DRX parameter in the DRX parameter IE in the ATTACH REQUEST message.

If the UE supports SRVCC to GERAN/UTRAN, the UE shall set the SRVCC to GERAN/UTRAN capability bit to "SRVCC from UTRAN HSPA or E-UTRAN to GERAN/UTRAN supported".

If the UE supports vSRVCC from S1 mode to Iu mode, then the UE shall set the H.245 after handover capability bit to "H.245 after SRVCC handover capability supported" and additionally set the SRVCC to GERAN/UTRAN capability bit to "SRVCC from UTRAN HSPA or E-UTRAN to GERAN/UTRAN supported" in the ATTACH REQUEST message.

FROM FIG. 16C

1600

○
○
○

If the UE supports PSM and decides to activate it, then the UE shall include the T3324 value IE in the ATTACH REQUEST message. When the UE includes the T3324 value IE, it may also include the T3412 extended value IE to request a particular T3412 value to be allocated.

The UE shall send the ATTACH REQUEST message together with a PDN CONNECTIVITY REQUEST message contained in the ESM message container information element to request PDN connectivity if the UE is not attaching for CIoT SMS services.

If the UE is CIoT capable, the network is CIoT capable (see description below) and the UE wants to a) send a SM, then the UE shall send the ATTACH REQUEST message together with SMS-SUBMIT message as defined in 3GPP 23.040 [x] contained in the CIoT message container information element. The UE shall set the Attach type to "SMS MO".

b) receive an SM, then the UE shall send the ATTACH REQUEST message. The UE shall set the Attach type to "SMS MT" ;or c) send and receive an SM, then the UE shall send the ATTACH REQUEST message together with SMS-SUBMIT message as defined in 3GPP 23.040 [x] contained in the CIoT message container information element. The UE shall set the Attach type to "SMS MO/MT".

If a valid NAS security context exists, the UE shall integrity protect the ATTACH REQUEST message combined with the PDN CONNECTIVITY REQUEST message. When the UE does not have a valid NAS security context, the ATTACH REQUEST message combined with the PDN CONNECTIVITY REQUEST message is not integrity protected.

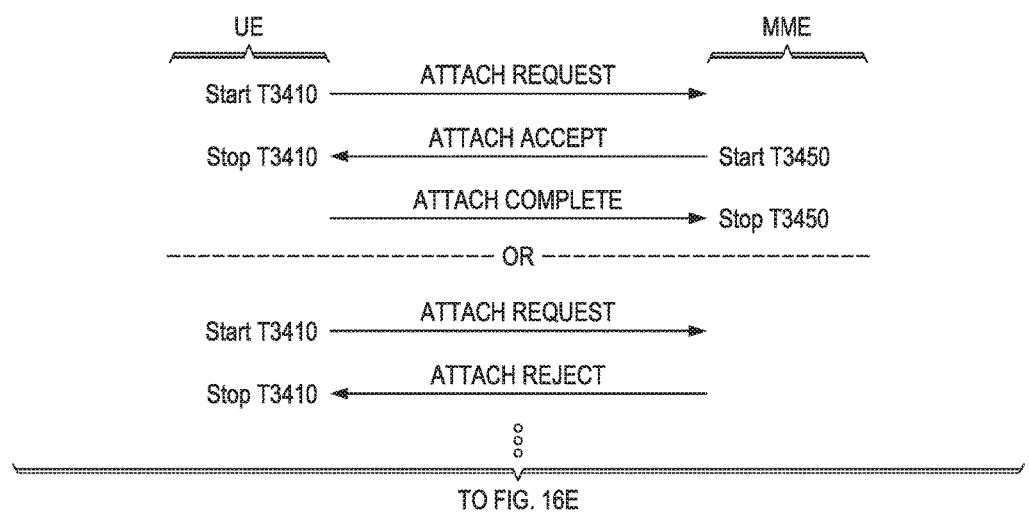

TO FIG. 16E

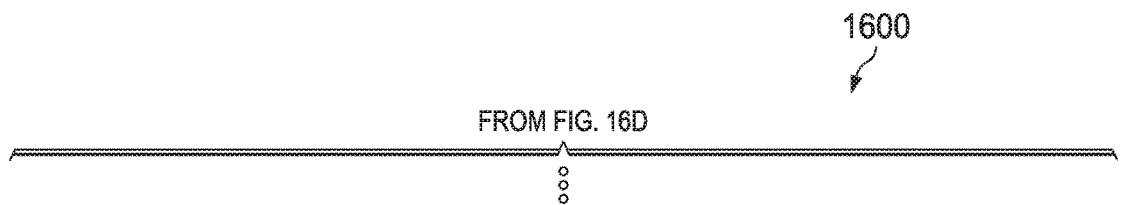

Figure 5.5.1.2.2.1: Attach procedure and combined attach procedure 5.5.1.2.3  EMM common procedure initiation The network may initiate EMM common procedures, e.g. the identification, authentication and security mode control procedures during the attach procedure, depending on the information received in the ATTACH REQUEST message (e.g. IMSI, GUTI and KSI).

If the network receives an ATTACH REQUEST message containing the Old GUTI type IE and the EPS mobile identity IE with type of identity indicating "GUTI", and the network does not follow the use of the most significant bit of the <MME group id> as specified in 3GPP TS 23.003 [2], subclause 2.8.2.2.2, the network shall use the Old GUTI type IE to determine whether the mobile identity included in the EPS mobile identity IE is a native GUTI or a mapped GUTI.

During an attach for emergency bearer services, the MME may choose to skip the authentication procedure even if no EPS security context is available and proceed directly to the execution of the security mode control procedure as specified in subclause 5.4.3.

5.5.1.2.4  Attach accepted by the network

During an attach for emergency bearer services, if not restricted by local regulations, the MME shall not check for mobility and access restrictions, regional restrictions, subscription restrictions, or perform CSG access control when processing the ATTACH REQUEST message. The network shall not apply subscribed APN based congestion control during an attach procedure for emergency bearer services.

1700

If the attach request is accepted by the network, the MME shall send an ATTACH ACCEPT message to the UE and start timer T3450. If the UE indicated:

a) EPS attach, combined EPS/IMSI attach then the MME shall send the ATTACH ACCEPT message together with an ACTIVATE DEFAULT EPS BEARER CONTEXT REQUEST message contained in the ESM message container information element to activate the default bearer (see subclause 6.4.1). The network may also initiate the activation of dedicated bearers towards the UE by invoking the dedicated EPS bearer context activation procedure (see subclause 6.4.2).

b) SMS MO, the MME shall send an ATTACH REJECT message with i) If the UE indicated the Attach type to "SMS MO" and the CIoT message container information element contained SMS PDU as defined in 3GPP TS 23.040 [x], EMM cause code set to 1) "Successful receipt of data" if there are no pending messages to be delivered to the UE; or 2) "successful receipt of data, and pending messages to send" if there are pending messages to be delivered to the UE.

ii) If the UE indicated the Attach type to "SMS MO" and the CIoT message container information element does not contain an SMS PDU as defined in 3GPP TS 23.040 [x] or the CIoT message container information element is not present, EMM cause code set to 1) "data not received" if there are no pending messages to be delivered to the UE; or 2) "data not received and pending data to send" if there are pending messages to be delivered to the UE;

iii) SMS MT the MME shall send ATTACH REJECT message with:

iiii) If the UE indicated the Attach type to "SMS MT", EMM cause code set to "no pending terminated messages to send" if there are no pending messages to be delivered to the UE.

ij) SMS MT the MME shall send ATTACH ACCEPT message with:

i) If the UE indicated the Attach type to "SMS MT" and, EMM cause code set to

1) "no pending terminated messages" if there is a single SMS MT PDU as defined in 3GPP TS 23.040 [x] and include the SMS MT PDU as defined in 3GPP TS 23.040 [x] in the CIoT message container information element.

2) "pending messages to send" if there are more than one SMS MT PDU as defined in 3GPP TS 23.040 [x] and include the first SMS MT PDU as defined in 3GPP TS 23.040 [x] in the CIoT message container information element.

FROM FIG. 17A

ALTERNATIVE TO d)2)

d) SMS MT the MME shall send ATTACH ACCEPT message with i) if there is a single SMS MT PDU as defined in 3GPP TS 23.040 [x] and include the SMS MT PDU as defined in 3GPP TS 23.040 [x] in the CIoT message container information element.

ii) if there are more than one SMS MT PDU as defined in 3GPP TS 23.040 [x] and include 1) the first SMS MT PDU as defined in 3GPP TS 23.040 [x] in the CIoT message container information element; and the Pending Messages information element with the number of pending messages to send.

e) SMS MO/MT the MME shall send an ATTACH REJECT message i) If the UE indicated the Attach type to "SMS MO/MT" and the CIoT message container information element contained SMS PDU as defined in 3GPP TS 23.040 [x], EMM cause code set to 1) "Successful receipt of data" if there are no pending messages to be delivered to the UE; or ALTERNATIVE TO e)i1)

1) " successful receipt of data, and no pending messages to send" if there are no pending messages to be delivered to the UE; or ii) If the UE indicated the Attach type to "SMS MO" and the CIoT message container information element does not contain an SMS PDU as defined in 3GPP TS 23.040 [x] or the CIoT message container information element is not present, EMM cause code set to 1) "data not received" if there are no pending messages to be delivered to the UE;

2) " data not received, pending messages to send" if there are pending messages to be delivered to the UE ALTERNATIVE TO e)ii1)

1) "data not received, no pending messages to send" if there are no pending messages to be delivered to the UE;

f) SMS MO/MT the MME shall send an ATTACH ACCEPT message i) If the UE indicated the Attach type to "SMS MO/MT" and the CIoT message container information element contained SMS PDU as defined in 3GPP TS 23.040 [x], EMM cause code set to "Successful receipt of data" and if there

FROM FIG. 17B

○
○
○

1) is a single SMS MT PDU as defined in 3GPP TS 23.040 [x] include the SMS MT PDU as defined in 3GPP TS 23.040 [x] in the CIoT message container information element.

2) if there are more than one SMS MT PDU as defined in 3GPP TS 23.040 [x] include the first SMS MT PDU as defined in 3GPP TS 23.040 [x] in the CIoT message container information element; and the Pending Messages information element with the number of pending messages to send ONE WILL APPRECIATE THAT THE ATTACH REJECT CAUSES MAY ALSO GO IN OTHER SECTIONS (5.5.1.2.5  Attach not accepted by the network)

If the attach request is accepted by the network, the MME shall delete the stored UE radio capability information, if any.

If the UE has included the UE network capability IE or the MS network capability IE or both in the ATTACH REQUEST message, the MME shall store all octets received from the UE, up to the maximum length defined for the respective information element.

NOTE 1:   This information is forwarded to the new MME during inter-MME handover or to the new SGSN during inter-system handover to A/Gb mode or Iu mode.

NOTE 2:   For further details concerning the handling of the MS network capability and UE network capability in the MME see also 3GPP TS 23.401 [10].

If the UE specific DRX parameter was included in the DRX Parameter IE in the ATTACH REQUEST message, the MME shall replace any stored UE specific DRX parameter with the received parameter and use it for the downlink transfer of signalling and user data.

The MME shall assign and include the TAI list the UE is registered to in the ATTACH ACCEPT message. The UE, upon receiving an ATTACH ACCEPT message, shall delete its old TAI list and store the received TAI list.

The MME may include T3412 extended value IE in the ATTACH ACCEPT message only if the UE indicates support of the extended periodic timer T3412 in the MS network feature support IE in the ATTACH REQUEST message.

The MME shall include the T3324 value IE in the ATTACH ACCEPT message only if the T3324 value IE was included in the ATTACH REQUEST message, and the MME supports and accepts the use of PSM.

FROM FIG. 17C

○
○
○

If the MME supports and accepts the use of PSM, and the UE included the T3412 extended value IE in the ATTACH REQUEST message, then the MME may take into account the T3412 value requested when providing the T3412 value IE and the T3412 extended value IE in the ATTACH ACCEPT message.

NOTE 3:    The MME, which supports the use of PSM, can take into consideration in order to provide a T3412 value to the UE e.g. local configuration or subscription data in HSS (see 3GPP TS 23.682 [11A] subclause 4.5.4, 3GPP TS 23.401 [10] subclause 4.3.17.3).

Upon receiving the ATTACH ACCEPT message, the UE shall stop timer T3410.

The GUTI reallocation may be part of the attach procedure. When the ATTACH REQUEST message includes the IMSI or IMEI, or the MME considers the GUTI provided by the UE is invalid, or the GUTI provided by the UE was assigned by another MME, the MME shall allocate a new GUTI to the UE. The MME shall include in the ATTACH ACCEPT message the new assigned GUTI together with the assigned TAI list. In this case the MME shall enter state EMM-COMMON-PROCEDURE-INITIATED as described in subclause 5.4.1.

For a shared network, the TAIs included in the TAI list can contain different PLMN identities. The MME indicates the selected core network operator PLMN identity to the UE in the GUTI (see 3GPP TS 23.251 [8B]).

If the ATTACH ACCEPT message contains a GUTI, the UE shall use this GUTI as the new temporary identity. The UE shall delete its old GUTI and store the new assigned GUTI. If no GUTI has been included by the MME in the ATTACH ACCEPT message, the old GUTI, if any available, shall be kept.

If A/Gb mode or Iu mode is supported in the UE, the UE shall set its TIN to "GUTI" when receiving the ATTACH ACCEPT message.

If the ATTACH ACCEPT message contains the T3412 extended value IE, then the UE shall use the value in T3412 extended value IE as periodic tracking area update timer (T3412). If the ATTACH ACCEPT message does not contain T3412 extended value IE, then the UE shall use the value in T3412 value IE as periodic tracking area update timer (T3412). If the UE needs a different T3412 value than provided by the network, then the UE shall wait until a tracking area updating procedure needs to be performed due to the circumstances described in subclauses 5.3.5, 5.5.3.2.2, 5.5.3.2.5, 5.5.3.2.6, 5.5.3.3.2, 5.5.3.3.5, 5.6.1.5 and 5.6.1.6 to request a particular T3412 value.

If the ATTACH ACCEPT message contains the T3324 value IE, then the UE shall start timer T3324 in EMM-REGISTERED state when EMM-CONNECTED mode is left. If the UE needs a different T3324 value than provided by the network, then the UE shall wait until a tracking area updating procedure needs to be performed due to the circumstances described in subclauses 5.3.5, 5.5.3.2.2, 5.5.3.2.5, 5.5.3.2.6, 5.5.3.3.2, 5.5.3.3.5, 5.6.1.5 and 5.6.1.6 to request a particular T3412 value.

FROM FIG. 17D

○
○
○

The MME may also include a list of equivalent PLMNs in the ATTACH ACCEPT message. Each entry in the list contains a PLMN code (MCC+MNC). The UE shall store the list as provided by the network, and if the attach procedure is not for emergency bearer services, the UE shall remove from the list any PLMN code that is already in the list of "forbidden PLMNs" or in the list of "forbidden PLMNs for GPRS service". In addition, the UE shall add to the stored list the PLMN code of the registered PLMN that sent the list. The UE shall replace the stored list on each receipt of the ATTACH ACCEPT message. If the ATTACH ACCEPT message does not contain a list, then the UE shall delete the stored list.

If the attach procedure is not for emergency bearer services, and if the PLMN identity of the registered PLMN is a member of the list of "forbidden PLMNs" or the list of "forbidden PLMNs for GPRS service", any such PLMN identity shall be deleted from the corresponding list(s).

The network informs the UE about the support of specific features, such as IMS voice over PS session, location services (EPC-LCS, CS-LCS) or emergency bearer services, in the EPS network feature support information element. In a UE with IMS voice over PS capability, the IMS voice over PS session indicator and the emergency bearer services indicator shall be provided to the upper layers. The upper layers take the IMS voice over PS session indicator into account as specified in 3GPP TS 23.221 [8A], subclause 7.2a and subclause 7.2b, when selecting the access domain for voice sessions or calls. When initiating an emergency call, the upper layers also take both the IMS voice over PS session indicator and the emergency bearer services indicator into account for the access domain selection. In a UE with LCS capability, location services indicators (EPC-LCS, CS-LCS) shall be provided to the upper layers. When MO-LR procedure is triggered by the UE's application, those indicators are taken into account as specified in 3GPP TS 24.171 [13C].

If the UE has initiated the attach procedure due to manual CSG selection and receives an ATTACH ACCEPT message; and the UE sent the ATTACH REQUEST message in a CSG cell, the UE shall check if the CSG ID and associated PLMN identity of the cell are contained in the Allowed CSG list. If not, the UE shall add that CSG ID and associated PLMN identity to the Allowed CSG list and the UE may add the HNB Name (if provided by lower layers) to the Allowed CSG list if the HNB Name is present in neither the Operator CSG list nor the Allowed CSG list.

When the UE receives the ATTACH ACCEPT message combined with the ACTIVATE DEFAULT EPS BEARER CONTEXT REQUEST message, it shall forward the ACTIVATE DEFAULT EPS BEARER CONTEXT REQUEST message to the ESM sublayer. Upon receipt of an indication from the ESM sublayer that the default EPS bearer context has been activated, the UE shall send an ATTACH COMPLETE message together with an ACTIVATE DEFAULT EPS BEARER CONTEXT ACCEPT message contained in the ESM message container information element to the network. Additionally, the UE shall reset the attach attempt counter, service request attempt counter and tracking area updating attempt counter, enter state EMM-REGISTERED and set the EPS update status to EU1 UPDATED.

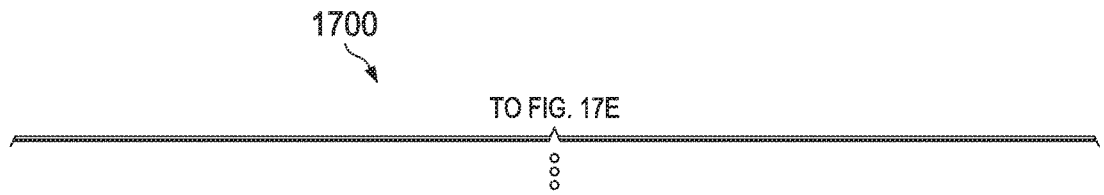

TO FIG. 17E

When the UE receives any ACTIVATE DEDICATED EPS BEARER CONTEXT REQUEST messages during the attach procedure, the UE shall forward the ACTIVATE DEDICATED EPS BEARER CONTEXT REQUEST message(s) to the ESM sublayer. The UE shall send a response to the ACTIVATE DEDICATED EPS BEARER CONTEXT REQUEST message(s) after successful completion of the attach procedure.

If the attach procedure was initiated in S101 mode, the lower layers are informed about the successful completion of the procedure.

Upon receiving an ATTACH COMPLETE message, the MME shall stop timer T3450, enter state EMM-REGISTERED and consider the GUTI sent in the ATTACH ACCEPT message as valid.

5.5.1.2.5     Attach not accepted by the network

If the attach request cannot be accepted by the network, the MME shall send an ATTACH REJECT message to the UE including an appropriate EMM cause value. If the attach procedure fails due to a default EPS bearer setup failure, an ESM procedure failure, or operator determined barring is applied on default EPS bearer context activation during attach procedure, the MME shall combine the ATTACH REJECT message with a PDN CONNECTIVITY REJECT message contained in the ESM message container information element. In this case the EMM cause value in the ATTACH REJECT message shall be set to #19 "ESM failure".
If the attach request is rejected due to NAS level mobility management congestion control, the network shall set the EMM cause value to #22 "congestion" and assign a back-off timer T3346. Upon receiving the ATTACH REJECT message, if the message is integrity protected or contains a reject cause other than EMM cause value #25, the UE shall stop timer T3410.
If the ATTACH REJECT message with EMM cause #25 was received without integrity protection, then the UE shall discard the message.
The UE shall take the following actions depending on the EMM cause value received in the ATTACH REJECT message.

3        (Illegal UE);

6        (Illegal ME); or

...

XX  (data not receive);

The UE shall repeat the ATTACH procedure for CIoT device up to a maximum number of times.

XX  (data not receive, no pending messages to send);

The UE shall repeat the ATTACH procedure and UE shall set the Attach type to "SMS MO".

XX  (data not received and pending data to send);

The UE shall repeat the ATTACH procedure and UE shall set the Attach type to "SMS MO/MT".

XX  (successful receipt of data, and pending messages to send);

The UE shall repeat the ATTACH procedure and UE shall set the Attach type to "SMS MT".

Other values are considered as abnormal cases. The behaviour of the UE in those cases is specified in subclause 5.5.1.2.6.

FIG. 18

8.2.1 Attach accept
8.2.1.1 Message definition

1900 

This message is sent by the network to the UE to indicate that the corresponding attach request has been accepted. See table 8.2.1.1.

Message type: ATTACH ACCEPT
Significance: dual
Direction: network to UE

| IEI | Information Element | Type/Reference | Presence | Format | Length |
|---|---|---|---|---|---|
|  | Protocol Discriminator | Protocol discriminator 9.2 | M | V | 1/2 |
|  | Security header type | Security header type 9.3.1 | M | V | 1/2 |
|  | Attach accept message identity | Message type 9.8 | M | V | 1 |
|  | EPS attach result | EPS attach result 9.9.3.10 | M | V | 1/2 |
|  | Spare half octet | Spare half octet 9.9.2.9 | M | V | 1/2 |
|  | T3412 value | GPRS timer 9.9.3.16 | M | V | 1 |
|  | TAI list | Tracking area identity list 9.9.3.33 | M | LV | 7-97 |
|  | ESM message container | ESM message container 9.9.3.15 | M | LV-E | 5-n |
| 50 | GUTI | EPS mobile identity 9.9.3.12 | O | TLV | 13 |
| 13 | Location area identification | Location area identification 9.9.2.2 | O | TV | 6 |
| 23 | MS identity | Mobile identity 9.9.2.3 | O | TLV | 7-10 |
| 53 | EMM cause | EMM cause 9.9.3.9 | O | TV | 2 |
| 17 | T3402 value | GPRS timer 9.9.3.16 | O | TV | 2 |

FROM FIG. 19A

| | | | | | |
|---|---|---|---|---|---|
| 59 | T3423 value | GPRS timer 9.9.3.16 | O | TV | 2 |
| 4A | Equivalent PLMNs | PLMN list 9.9.2.8 | O | TLV | 5-47 |
| 34 | Emergency number list | Emergency number list 9.9.3.37 | O | TLV | 5-50 |
| 64 | EPS network feature support | EPS network feature support 9.9.3.12A | O | TLV | 3 |
| F- | Additional update result | Additional update result 9.9.3.0A | O | TV | 1 |
| 5E | T3412 extended value | GPRS timer 3 9.9.3.16B | O | TLV | 3 |
| F1 | T3324 value | GPRS timer 9.9.3.16 | O | TV | 2 |
| | CioT message | CioT message 9.9.3.XX | O | LV-E | 5-n |
| | EMM cause | EMM cause 9.9.3.9 | O | V | 1 |
| | Pending messages | Pending messages 9.9.3.yy | O | TV | 2 |

FIG. 19B 8.2.3 Attach reject
8.2.3.1 Message definition

This message is sent by the network to the UE to indicate that the corresponding attach request has been rejected. See table 8.2.3.1.

Message type:    ATTACH REJECT

Significance:    dual

Direction:    network to UE

Table 8.2.3.1: ATTACH REJECT message content

| IEI | Information Element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Attach accept message identity | Message type 9.8 | M | V | 1 |
| | EMM cause | EMM cause 9.9.3.9 | M | V | 1 |
| 78 | ESM message container | ESM message container 9.9.3.15 | O | TLV-E | 6-n |
| 5F | T3346 value | GPRS timer 2 9.9.3.16A | O | TLV | 3 |
| 16 | T3402 value | GPRS timer 2 9.9.3.16A | O | TLV | 3 |
| | CIoT message | CIoT message 9.9.3.XX | O | LV-E | 5-n |

FIG. 20

8.2.4 Attach request
8.2.4.1 Message definition
This message is sent by the UE to the network in order to perform an attach procedure. See table 8.2.4.1.

Message type:    ATTACH REQUEST

Significance:    dual

Direction:    UE to network

2100

Table 8.2.4.1: ATTACH REQUEST message content

| IEI | Information Element | Type/Reference | Presence | Format | Length |
|---|---|---|---|---|---|
|  | Protocol discriminator | Protocol discriminator 9.2 | M | V | 1/2 |
|  | Security header type | Security header type 9.3.1 | M | V | 1/2 |
|  | Attach request message identity | Message type 9.8 | M | V | 1 |
|  | EPS attach type | EPS attach result 9.9.3.10 | M | V | 1/2 |
|  | NAS key set identifier | NAS key set identifier 9.9.3.21 | M | V | 1/2 |
|  | EPS mobile identity | EPS mobile identity 9.9.3.12 | M | LV | 5-12 |
|  | UE network capability | UE network capability 9.9.3.34 | M | LV | 3-14 |
|  | CIoT message | CIoT message 9.9.3.XX | O | LV-E | 5-n |
| 19 | Old P-TMSI signature | P-TMSI signature 9.9.3.26 | O | TV | 4 |
| 50 | Additional GUTI | EPS mobile identity 9.9.3.12 | O | TLV | 13 |
| 52 | Last visited registered TAI | Tracking area identity 9.9.3.32 | O | TV | 6 |
| 5C | DRX parameter | DRX parameter 9.9.3.8 | O | TV | 3 |
| 31 | MS network capability | MS network capability 9.9.3.20 | O | TLV | 4-10 |

FROM FIG. 21A

2100

| | | | | | |
|---|---|---|---|---|---|
| 13 | Old location area identification | Location area identification 9.9.2.2 | O | TV | 6 |
| 9- | TMSI status | TMSI status 9.9.3.31 | O | TV | 1 |
| 11 | Mobile station classmark 2 | Mobile station classmark 2 9.9.2.4 | O | TLV | 5 |
| 20 | Mobile station classmark 3 | Mobile station classmark 3 9.9.2.5 | O | TLV | 2-34 |
| 40 | Supported Codecs | Supported codec list 9.9.2.10 | O | TLV | 5-n |
| F- | Additional update type | Additional update type 9.9.3.0B | O | TV | 1 |
| 5D | Voice domain preference and UE's usage setting | Voice domain preference and UE's usage setting | O | TLV | 3 |
| D- | Device properties | Device properties 9.9.2.0A | O | TV | 1 |
| E- | Old GUTI type | GUTI type 9.9.3.45 | O | TV | 1 |
| C- | MS network feature support | MS network feature support 9.9.3.20A | O | TV | 1 |
| 10 | TMSI based NRI container | Network resource identifier container 9.9.3.24A | O | TLV | 4 |
| F1 | T3324 value | GPRS timer 9.9.3.16 | O | TV | 2 |
| 6A | T3412 extended value | GPRS timer 3 9.9.3.16B | O | TLV | 3 |
| | Pending messages | Pending messages 9.9.3.YY | O | TV | 2 |

FIG. 21B 9.9.3.9 EMM cause
The purpose of the EMM cause information element is to indicate the reason why an EMM request from the UE is rejected by the network.
The EMM cause information element is coded as shown in figure 9.9.3.9.1 and table 9.9.3.9.1.
The EMM cause is a type 3 information element with 2 octets length.

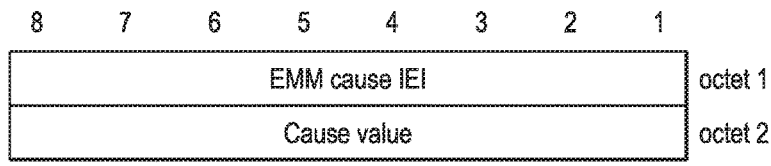

| 8 | 7 | 6 | 5 | 4 | 3 | 2 | 1 | |
|---|---|---|---|---|---|---|---|---|
| | | | EMM cause IEI | | | | | octet 1 |
| | | | Cause value | | | | | octet 2 |

Figure 9.9.3.9.1: EMM cause information element

```
Cause value (octet 2)
Bits
8 7 6 5 4 3 2 1
0 0 0 0 0 0 1 0    IMSI unknown in HSS
0 0 0 0 0 0 1 1    Illegal UE
0 0 0 0 0 1 0 1    IMEI not accepted
0 0 0 0 0 1 1 0    Illegal ME
0 0 0 0 0 1 1 1    EPS services not allowed
0 0 0 0 1 0 0 0    EPS services and non-EPS services not allowed
0 0 0 0 1 0 0 1    UE identity cannot be derived by the network
0 0 0 0 1 0 1 0    Implicitly detached
0 0 0 0 1 0 1 1    PLMN not allowed
0 0 0 0 1 1 0 0    Tracking Area not allowed
0 0 0 0 1 1 0 1    Roaming not allowed in this tracking area
0 0 0 0 1 1 1 0    EPS services not allowed in this PLMN
0 0 0 0 1 1 1 1    No Suitable Cells In tracking area
0 0 0 1 0 0 0 0    MSC temporarily not reachable
0 0 0 1 0 0 0 1    Network failure
0 0 0 1 0 0 1 0    CS domain not available
0 0 0 1 0 0 1 1    ESM failure
0 0 0 1 0 1 0 0    MAC failure
0 0 0 1 0 1 0 1    Synch failure
0 0 0 1 0 1 1 0    Congestion
0 0 0 1 0 1 1 1    UE security capabilities mismatch
0 0 0 1 1 0 0 0    Security mode rejected, unspecified
0 0 0 1 1 0 0 1    Not authorized for this CSG
0 0 0 1 1 0 1 0    Non-EPS authentication unacceptable
0 0 1 0 0 0 1 1    Requested service option not authorized in this PLMN
```

FROM FIG. 22A

| | |
|---|---|
| 0 0 1 0 0 1 1 1 | CS service temporarily not available |
| 0 0 1 0 1 0 0 0 | No EPS bearer context activated |
| 0 0 1 0 1 0 1 0 | Severe network failure |
| 0 1 0 1 1 1 1 1 | Semantically incorrect message |
| 0 1 1 0 0 0 0 0 | Invalid mandatory information |
| 0 1 1 0 0 0 0 1 | Message type non-existent or not implemented |
| 0 1 1 0 0 0 1 0 | Message type not compatible with the protocol state |
| 0 1 1 0 0 0 1 1 | Information element non-existent or not implemented |
| 0 1 1 0 0 1 0 0 | Conditional IE error |
| 0 1 1 0 0 1 0 1 | Message not compatible with the protocol state |
| 0 1 1 0 1 1 1 1 | Protocol error, unspecified |
| | successful receipt of data |
| | no pending terminated messages |
| | data not received |
| | data not received, no pending messages to send |
| | data not received, pending messages to send |
| | Pending data to send |
| | successful receipt of data, and pending messages to send |
| | successful receipt of data, and no pending messages to send |

Any other value received by the mobile station shall be treated as 0110 1111, "protocol error, unspecified". Any other value received by the network shall be treated as 0110 1111, "protocol error, unspecified".

FIG. 22B 9.9.3.11  EPS attach type

The purpose of the EPS attach type information element is to indicate the type of the requested attach.

The EPS attach type information element is coded as shown in figure 9.9.3.11.1 and table 9.9.3.11.1.

The EPS attach type is a type 1 information element.

| 8 | 7 | 6 | 5 | 4 | 3 | 2 | 1 | |
|---|---|---|---|---|---|---|---|---|
| EPS attach type IEI | | | | 0 Spare | EPS attach type value | | | octet 1 |

Figure 9.9.3.11.1: EPS attach type information element

Table 9.9.3.11.1: EPS attach type information element

```
EPS attach type value (octet 1)
Bits
3 2 1
0 0 1    EPS attach
0 1 0    combined EPS/IMSI attach
1 1 0    EPS emergency attach
1 1 1    reserved
All other values are unused and shall be interpreted as "EPS attach", if received by
the network.

Bit 4 of octet 1 When coded as 1 indicates attach type has been extended
```

```
EPS attach type value (octet 2)
Bits
3 2 1
0 0 1    EPS attach for CioT
0 1 0    SMS data attach
1 1 0    reserved
1 1 1    reserved
All other values are unused and shall be interpreted as "EPS attach for CioT", if
received by the network.

Bit 4-8 of octet 2 spare and coded as zero
```

Other values could be
1. SMS MO attach
2. SMS MT attach
3. SMS MO/MT attach

The setting of the EPS attach type value to SMS data attach or any of the other 3 values is equivalent to setting "Active" flag in the EPS update type as described in sub-clause 9.9.3.14.

FIG. 23

9.9.3.XX    CioT message container
This purpose of the CioT message container is to transfer of small data within an EMM message.
The following IEI values are defined:

Table 9.8.1: CioT message types for EPS mobility management

```
Bits
8 7 6 5 4 3 2 1
0 1 - - - - - -    SMS message container
1 0 - - - - - -    USSD message container
```

FIG. 24

9.9.3.XX+1    Data message container information element
The purpose of the Data message container information element is to enable transfer of a Data message within an EMM message e.g.SMS or USSD. SMS payload is defined within 3GPP TS 23.040. The SMS message included in this IE shall be coded as specified in subclause 8.3, i.e. without NAS security header.
The SMS message container information element is coded as shown in figure 9.9.3.XX.1 and table 9.9.3.XX.1.

| 8 | 7 | 6 | 5 | 4 | 3 | 2 | 1 | |
|---|---|---|---|---|---|---|---|---|
| CIOT Message types for EPS mobility management container IEI ||||||||  octet 1 |
| Length of Data message container contents |||||||| octet 2 / octet 3 |
| Data message container contents |||||||| octet 4 ... octet n |

Figure 9.9.3.xx+1.1: Data message container information element

Table 9.9.3.xx+1.1: Data message container information element

SMS message container contents (octet 4 to octet n);
Max value of YYY octets
This IE can contain any SMS PDU as
defined in 3GPP TS 23.040 .

9.9.3.YY    Pending messages
The purpose of this information element is to indicate the number of messages to be sent or received by the UE.

| 8 | 7 | 6 | 5 | 4 | 3 | 2 | 1 | |
|---|---|---|---|---|---|---|---|---|
| Pending message container IEI ||||||||  octet 1 |
| Number of pending messages |||||||| octet 2 |

Figure 9.9.3.YY.1: Pending messages information element

8.5.2  MAP_SEND_AUTHENTICATION_INFO service
8.5.2.1 Definition
This service is used between the VLR and the HLR for the VLR to retrieve authentication information from the HLR. The VLR requests up to five authentication vectors.

Also this service is used between the SGSN and the HLR for the SGSN to retrieve authentication information from the HLR. The SGSN requests up to five authentication vectors.

Also this service is used between the BSF and the HLR for the BSF to retrieve authentication information from the HLR. The BSF shall only request one authentication vector at a time.

In an EPS, this service is used between IWF and IWF and between IWF and HSS.

If the requesting node type is different from "MME" and the user is a UMTS subscriber, the HLR shall return authentication quintuplets. If the requesting node type is different from MME and the user is a GSM subscriber, the HLR shall return authentication triplets.

If the requesting node type is "MME", the HSS shall return EPS authentication vectors and may return pending messages to send to the UE.

....

8.5.2.2 Service primitives
The service primitives are shown in table 8.5/2.

TABLE 8.5/2: MAP_SEND_AUTHENTICATION_INFO parameters

| Parameter name | Request | Indication | Response | Confirm |
|---|---|---|---|---|
| Invoke id | M | M (=) | M (=) | M (=) |
|  |  |  |  |  |

FROM FIG. 27A

| | | | | |
|---|---|---|---|---|
| IMSI | C | C (=) | | |
| Number of requested vectors | C | C (=) | | |
| Requesting node type | C | C (=) | | |
| Re-synchronisation info | C | C (=) | | |
| Segmentation prohibited indicator | C | C (=) | | |
| Immediate response preferred indicator | U | C (=) | | |
| Requesting PLMN ID | C | C (=) | | |
| Number of additional requested vectors | C | C (=) | | |
| Additional requested vectors are for EPS | C | C (=) | | |
| SMS only indicator | C | C (=) | | |
| AuthenticationSetList | | | C | C (=) |
| Pending messages to send | | | C | C |
| User error | | | C | C (=) |
| Provider error | | | | O |

8.5.2.3 Parameter use

...

<u>Additional vectors are for EPS</u>

This parameter shall be absent if Number of additional vectors is absent. The parameter indicates by its presence that additional vectors (i.e. not for immediate use) are for EPS.

This parameter shall be present in the first (or only) request of the dialogue. If multiple service requests are present in a dialogue then this parameter shall not be present in any service request other than the first one.

<u>SMS only indicator</u> o
o
o

TO FIG. 27C

FROM FIG. 27B

○
○
○

This parameter indicates if the UE has requested to attach only for sending and/or receiving Short Messages.

OR

This parameter indicates if the UE has requested to attach only for SMS.

AuthenticationSetList

A set of one to five authentication vectors are transferred from the HLR to the VLR, from the HLR to the SGSN or IWF or from the HLR to the BSF, if the outcome of the service was successful.

Pending messages to send

This parameter shall be present if the HSS/HLR is aware of one or more Short Messages that are to be sent to the UE. This parameter shall be absent if the HSS/HLR is unaware of any Short Messages that are to be sent to the UE.

OR:

A number indicating how many Short Messages the UE shall be prepared to receive before performing a network detach.

User error

One of the following error causes defined in clause 7.6.1 shall be sent by the user in case of unsuccessful outcome of the service, depending on the respective failure reason:

- unknown subscriber;
- unexpected data value;
- system failure;
- data missing.

Provider error

See clause 7.6.1 for the use of this parameter.

FIG. 27C 8.1.2 MAP_UPDATE_LOCATION service
8.1.2.1 Definition

This service is used by the VLR to update the location information stored in the HLR.
The MAP_UPDATE_LOCATION service is a confirmed service using the service primitives given in table 8.1/2.
8.1.2.2 Service primitives Table 8.1/2: MAP_UPDATE_LOCATION

| Parameter name | Request | Indication | Response | Confirm |
|---|---|---|---|---|
| Invoke Id | M | M (=) | M (=) | M (=) |
| IMSI | M | M (=) | | |
| MSC Address | M | M (=) | | |
| VLR number | M | M (=) | | |
| LMSI | U | C (=) | | |
| Supported CAMEL Phases | C | C (=) | | |
| SOLSA Support Indicator | C | C (=) | | |
| IST Support Indicator | C | C (=) | | |
| Super-Charger Supported in Serving Network Entity | C | C (=) | | |
| Long FTN Supported | C | C (=) | | |
| Supported LCS Capability Sets | C | C (=) | | |
| Offered CAMEL 4 CSIs | C | C (=) | | |
| Inform Previous Network Entity | C | C (=) | | |
| CS LCS Not Supported by UE | C | C (=) | | |
| V-GMLC Address | U | C (=) | | |
| IMEISV | C | C (=) | | |
| Skip Subscriber Data Update | U | C (=) | | |
| Supported RAT Types Indicator | U | C (=) | | |

FROM FIG. 28A

2800

| | | | | |
|---|---|---|---|---|
| Paging Area | U | C (=) | | |
| Restoration Indicator | U | C (=) | | |
| MTRF Supported | U | C (=) | | |
| SMS only Indicator | C | C (=) | | |
| ADD Capability | | | U | C (=) |
| Paging Area Capability | | | U | C (=) |
| HLR number | | | C | C (=) |
| Pending messages to send | | | C | C |
| User error | | | C | C (=) |
| Provider error | | | | O |

8.1.2.3 Parameter definitions and use

...

SMS only indicator

This parameter indicates if the UE has requested to attach only for sending and/or receiving Short Messages.

OR

This parameter indicates if the UE has requested to attach only for SMS.

Paging Area Capability

This parameter indicates, if present, the support of Paging Area function by the HLR. The HLR shall report the same capability for all subscribers.

Pending messages to send

This parameter shall be present if the HSS/HLR is aware of one or more Short Messages that are to be sent to the UE. This parameter shall be absent if the HSS/HLR is unaware of any Short Messages that are to be sent to the UE.

FROM FIG. 28B

○
○
○

A number indicating how many Short Messages the UE shall be prepared to receive before performing a network detach.

<u>User error</u>

In case of unsuccessful updating, an error cause shall be returned by the HLR. The following error causes defined in clause 7.6.1 may be used, depending on the nature of the fault:

- unknown subscriber;
- roaming not allowed;

This cause will be sent if the MS is not allowed to roam into the PLMN indicated by the VLR number. The cause is qualified by the roaming restriction reason "PLMN Not Allowed", "Supported RAT Types Not Allowed" or "Operator Determined Barring". If no qualification is received (HLR with MAP Version 1), "PLMN Not Allowed" is taken as default.

This cause shall be used when the HLR rejects a MAP Update Location request received for an MSISDN-less subscription from a VLR not supporting MSISDN-less operation (see subclause 3.6.1.5 of 3GPP TS 23.012 [23]).

- system failure;
- unexpected data value.

<u>Provider error</u>

For definition of provider errors see clause 7.6.1.

FIG. 28C 8.1.7 MAP_UPDATE_GPRS_LOCATION service
8.1.7.1 Definition

This service is used by the SGSN to update the location information stored in the HLR.
In an EPS, this service is used between IWF and IWF and between IWF and HSS.
The MAP_UPDATE_GPRS_LOCATION service is a confirmed service using the service
primitives given in table 8.1/7.

8.1.7.2 Service primitives

Table 8.1/7: MAP_UPDATE_GPRS_LOCATION

| Parameter name | Request | Indication | Response | Confirm |
|---|---|---|---|---|
| Invoke Id | M | M (=) | M (=) | M (=) |
| IMSI | M | M (=) | | |
| SGSN number | M | M (=) | | |
| SGSN address | M | M (=) | | |
| Supported CAMEL Phases | C | C (=) | | |
| SoLSA Support Indicator | C | C (=) | | |
| Super-Charger Supported in Serving Network Entity | C | C (=) | | |
| GPRS enhancements support indicator | C | C (=) | | |
| Supported LCS Capability Sets | C | C (=) | | |
| Offered CAMEL 4 CSIs | C | C (=) | | |
| Inform Previous Network Entity | C | C (=) | | |
| PS LCS Not Supported by UE | C | C (=) | | |
| V-GMLC Address | U | C (=) | | |
| Call barring support indicator | C | C (=) | | |
| IMEISV | C | C (=) | | |

FROM FIG. 29A

| | | | | |
|---|---|---|---|---|
| Skip Subscriber Data Update | U | C (=) | | |
| Supported RAT Types Indicator | U | C (=) | | |
| EPS Info | C | C (=) | | |
| Serving Node Type Indicator | C | C (=) | | |
| Supported Features | U | C (=) | | |
| Used RAT Type | U | C (=) | | |
| GPRS Subscription Data not needed Indicator | C | C (=) | | |
| EPS Subscription Data Not Needed Indicator | C | C (=) | | |
| Node-Type-Indicator | U | C (=) | | |
| Area Restricted Indicator | C | C (=) | | |
| UE Reachable Indicator | C | C (=) | | |
| T-ADS Data Retrieval Support Indicator | C | C (=) | | |
| Homogeneous Support Of IMS Voice Over PS Sessions | C | C (=) | | |
| UE SRVCC Capability | C | C (=) | | |
| SMS only indicator | C | C (=) | | |
| ADD Capability | | | U | C (=) |
| SGSN-MME Separation Support Indicator | | | C | C (=) |
| HLR number | | | C | C (=) |
| Pending messages to send | | | C | C |
| User error | | | C | C (=) |
| Provider error | | | | O |

FROM FIG. 29B 8.1.7.3 Parameter definitions and use
...

SMS only indicator

This parameter indicates if the UE has requested to attach only for sending and/or receiving Short Messages.

OR

This parameter indicates if the UE has requested to attach only for SMS.

MME Registered for SMS

This parameter indicates by its presence that the HSS has registered the MME for SMS.

Pending messages to send

This parameter shall be present if the HSS/HLR is aware of one or more Short Messages that are to be sent to the UE. This parameter shall be absent if the HSS/HLR is unaware of any Short Messages that are to be sent to the UE.

OR:

A number indicating how many Short Messages the UE shall be prepared to receive before performing a network detach.

User error

In case of unsuccessful updating, an error cause shall be returned by the HLR. The following error causes defined in clause 7.6.1 may be used, depending on the nature of the fault:

- unknown subscriber;
- roaming not allowed.

This cause will be sent if the MS is not allowed to roam into the PLMN indicated by the SGSN number. The cause is qualified by the roaming restriction reason "PLMN Not Allowed", "Supported RAT Types Not Allowed" or "Operator Determined Barring".

This cause shall be used when the HLR rejects a MAP Update Gprs Location request received for an MSISDN-less subscription from a SGSN not supporting MSISDN-less operation.

- system failure;
- unexpected data value.

The diagnostic in the Unknown Subscriber may indicate "Imsi Unknown" or "Gprs or EPS Subscription Unknown".

Provider error

For definition of provider errors see clause 7.6.1.

FIG. 29C 8.8.1 MAP-INSERT-SUBSCRIBER-DATA service
8.8.1.1 Definition

......

8.8.1.2 Service primitives

Table 8.8/1: MAP-INSERT-SUBSCRIBER-DATA

| Parameter name | Request | Indication | Response | Confirm |
|---|---|---|---|---|
| Invoke Id | M | M (=) | M (=) | M (=) |
| IMSI | C | C (=) | | |
| MSISDN | C | C (=) | | |
| Category | C | C (=) | | |
| Subscriber Status | C | C (=) | | |
| Bearer service List | C | C (=) | C | C (=) |
| Teleservice List | C | C (=) | C | C (=) |
| Forwarding information List | C | C (=) | | |
| Call barring information List | C | C (=) | | |
| CUG information List | C | C (=) | | |
| SS-Data List | C | C (=) | | |
| eMLPP Subscription Data | C | C (=) | | |
| MC-subscription data | C | C (=) | | |
| Operator Determined Barring General data | C | C (=) | C | C (=) |
| Operator Determined Barring HPLMN data | C | C (=) | | |
| Roaming Restriction Due To Unsupported Feature | C | C (=) | | |
| Regional Subscription Data | C | C (=) | | |
| VLR CAMEL Subscription Info | C | C (=) | | |

FROM FIG. 30A

| | | | | |
|---|---|---|---|---|
| Voice Broadcast Data | C | C (=) | | |
| Voice Group Call Data | C | C (=) | | |
| Network access mode | C | C (=) | | |
| GPRS Subscription Data | C | C (=) | | |
| EPS Subscription Data | C | C (=) | | |
| VPLMN LIPA Allowed | C | C (=) | | |
| Roaming Restricted In SGSN/MME Due To Unsupported Feature | C | C (=) | | |
| North American Equal Access preferred Carrier Id List | U | C (=) | | |
| SGSN CAMEL Subscription Info | C | C (=) | | |
| LSA Information | C | C (=) | | |
| IST Alert Timer | C | C (=) | | |
| SS-Code List | | | C | C (=) |
| LMU Identifier | C | C (=) | | |
| LCS Information | C | C (=) | | |
| CS Allocation/Retention priority | C | C (=) | | |
| Super-Charger Supported In HLR | C | C (=) | | |
| Subscribed Charging Characteristics | C | C (=) | | |
| Access Restriction Data | C | C (=) | | |
| ICS Indicator | U | C (=) | | |
| CSG Subscription Data | C | C (=) | | |
| UE Reachability Request Indicator | C | C (=) | | |

3000 — FROM FIG. 30B

| | | | | |
|---|---|---|---|---|
| SGSN Number | C | C (=) | | |
| MME-Name | C | C (=) | | |
| Subscribed Periodic RAU-TAU Timer | C | C (=) | | |
| Subscribed Periodic LAU Timer | C | C (=) | | |
| MDT User Consent | C | C (=) | | |
| Pending messages to send | C | C (=) | | |
| Regional Subscription Response | | | C | C (=) |
| Supported CAMEL Phases | | | C | C (=) |
| Offered CAMEL 4 CSIs | | | C | C (=) |
| Supported Features | | | U | C (=) |
| User error | | | U | C (=) |
| Provider error | | | | O |

8.8.1.3 Parameter use
All parameters are described in clause 7.6. The following clarifications are applicable:

...

Adjacent Access Restriction Data

This parameter indicates the allowed RAT in each one of the indicated PLMN IDs, according to subscription data.

This parameter shall not be used by the CSS.

Pending messages to send

This parameter shall be present if the HSS/HLR is aware of one or more Short Messages that are to be sent to the UE. This parameter shall be absent if the HSS/HLR is unaware of any Short Messages that are to be sent to the UE.

OR:

A number indicating how many Short Messages the UE shall be prepared to receive before performing a network detach.

User error

Only one of the following values is applicable:
  - Unidentified subscriber;
  - Data missing;
  - Unexpected data value.

12.3 MAP-REPORT-SM-DELIVERY-STATUS service 12.3.1 Definition

This service is used between the gateway MSC and the HLR or the external Short Message Gateway (IP-SM-GW) and the HLR. The MAP-REPORT-SM-DELIVERY-STATUS service is used to set the Message Waiting Data into the HLR or to inform the HLR of successful SM transfer after polling. This service is invoked by the gateway MSC or the external Short Message Gateway (IP-SM-GW).

The MAP-REPORT-SM-DELIVERY-STATUS service is a confirmed service using the service primitives given in table 12.3/1.

12.3.2 Service primitives

Table 12.3/1: MAP-REPORT-SM-DELIVERY-STATUS

| Parameter name | Request | Indication | Response | Confirm |
|---|---|---|---|---|
| Invoke Id | M | M (=) | M (=) | M (=) |
| MSISDN | M | M (=) | | |
| IMSI | C | C (=) | | |
| Service Centre Address | M | M (=) | | |
| SM Delivery Outcome | M | M (=) | | |
| Absent Subscriber Diagnostic SM | C | C (=) | | |
| GPRS Support Indicator | C | C (=) | | |
| Delivery Outcome Indicator | C | C (=) | | |
| Additional SM Delivery Outcome | C | C (=) | | |
| Additional Absent Subscriber Diagnostic SM | C | C (=) | | |
| IP-SM-GW-Indicator | C | C (=) | | |
| IP-SM-GW SM Delivery Outcome | C | C (=) | | |
| IP-SM-GW Absent Subscriber Diagnostic SM | C | C (=) | | |
| Single Attempt Delivery | C | C (=) | | |
| Correlation ID | C | C (=) | | |

FROM FIG. 31A

| | | | | |
|---|---|---|---|---|
| Pending messages to send | C | C (=) | | |
| MSIsdn-Alert | | | C | C (=) |
| User error | | | C | C (=) |
| Provider error | | | | O |

12.3.3 Parameter use

...

MSIsdn-Alert

See definition in clause 7.6.2. This parameter shall be present in case of unsuccessful delivery, when the MSISDN received in the operation is different from the stored MSIsdn-Alert; the stored MSIsdn-Alert is the value that is returned to the gateway MSC.

Pending messages to send

This parameter shall be present if the HSS/HLR is aware of one or more Short Messages that are to be sent to the UE. This parameter shall be absent if the HSS/HLR is unaware of any Short Messages that are to be sent to the UE.

OR:

A number indicating how many Short Messages the UE shall be prepared to receive before performing a network detach.

User error

The following errors defined in clause 7.6.1 may be used, depending on the nature of the fault:

- Unknown Subscriber;
- Message Waiting List Full;
- Unexpected Data Value;
- Data missing.

Provider error

For definition of provider errors see clause 7.6.1.

FIG. 31B

...
17.7 MAP constants and data types
17.7.1 Mobile Service data types
...

```
SendAuthenticationInfoArg ::= SEQUENCE {
    imsi                            [0] IMSI,
    numberOfRequestedVectors            NumberOfRequestedVectors,
    segmentationProhibited              NULL                            OPTIONAL,
    immediateResponsePreferred      [1] NULL                            OPTIONAL,
    re-synchronisationInfo              Re-synchronisationInfo          OPTIONAL,
    extensionContainer              [2] ExtensionContainer              OPTIONAL,
    ...,
    requestingNodeType              [3] RequestingNodeType              OPTIONAL,
    requestingPLMN-Id               [4] PLMN-Id                         OPTIONAL,
    numberOfRequestedAdditional-Vectors [5] NumberOfRequestedVectors    OPTIONAL,
    additionalVectorsAreForEPS      [6] NULL                            OPTIONAL,
    sMS-OnlyIndicator               [7] SMS-OnlyIndicator }
```

```
SMS-OnlyIndicator ::= ENUMERATED {
    MO  (0),
    Mt  (1),
    MOandMT (3)
    ...
}
```

If the "Pending messages to send" IE is a simple flag/indicator:

```
SendAuthenticationInfoRes ::= [3] SEQUENCE {
    authenticationSetList       AuthenticationSetList       OPTIONAL,
    extensionContainer          ExtensionContainer          OPTIONAL,
    ...,
    eps-AuthenticationSetList   [2] EPS-AuthenticationSetList   OPTIONAL,
    pendingMessagesToSend       [3] NULL                        OPTIONAL }
```

If the "Pending messages to send" IE indicates the number of messages that are to be sent to the UE (e.g. as stored in the HSS/HLR):

```
SendAuthenticationInfoRes ::= [3] SEQUENCE {
    authenticationSetList       AuthenticationSetList       OPTIONAL,
    extensionContainer          ExtensionContainer          OPTIONAL,
    ...,
    eps-AuthenticationSetList   [2] EPS-AuthenticationSetList       OPTIONAL,
    pendingMessagesToSend       [3] PendingMessagesToSend           OPTIONAL }
```

```
NumberOfPendingMessagesToSend ::= INTEGER (0..MaxNumberOfPendingMessagesToSend)
```

```
MaxNumberOfPendingMessagesToSend ::= 255
```

FIG. 32

OPTIMIZED SHORT MESSAGE TRANSPORT

CROSS REFERENCE TO RELATED APPLICATION

This patent is a continuation of and claims the benefit of U.S. Non-Provisional application Ser. No. 14/834,216, filed on Aug. 24, 2015, the entire contents of which is hereby expressly incorporated by reference herein in its entirety.

TECHNICAL FIELD

This disclosure relates to data transmission in wireless communication systems and, more specifically, to optimized short message transport in a cellular Internet of Things environment.

BACKGROUND

In some cases, a cellular Internet of Things (CIoT) is a scenario that a large number of devices, e.g., millions or billions of devices, may be served by a wireless network. The devices may range from stationary devices deep in basements to devices that have limited mobility speed. The devices may send and/or receive infrequent, small amounts of data. Examples of CIoT devices may include smart utility meters such as gas, water, or electric meters that may autonomously report utility usage to the utility provider via the wireless network. Other example of CIoT devices may include environmental monitoring sensors that may be placed randomly in a geographical area to monitor air or water quality. In some cases, short message service (SMS) may be used for a device to send and/or receive a short message up to 140 bytes/octets in length. The infrequent and small amount of CIoT data may be included in the short message and delivered to the network by SMS.

DESCRIPTION OF DRAWINGS

FIGS. 16A-16E illustrate a first example description of Evolved Packet System (EPS) mobility management (EMM) procedures according to an implementation.

FIGS. 17A-17F illustrate a second example description of EMM procedures according to an implementation.

FIG. 18 illustrates a third example description of EMM procedures according to an implementation.

FIGS. 19A and 19B illustrate an example description of an attach accept message according to an implementation.

FIG. 20 illustrates an example description of an attach reject message according to an implementation.

FIGS. 21A and 21B illustrate an example description of an attach request message according to an implementation.

FIGS. 22A and 22B illustrate an example description of EMM cause according to an implementation.

FIG. 23 illustrates an example description of EPS attach type according to an implementation.

FIG. 24 illustrates an example description of a CIoT message container according to an implementation.

FIG. 25 illustrates an example description of data message container information element (IE) according to an implementation.

FIG. 26 illustrates an example description of pending messages IE according to an implementation.

FIGS. 27A-27C illustrate an example description of MAP_SEND_AUTHENTICATION_INFO service according to an implementation.

FIGS. 28A-28C illustrate an example description of MAP_UPDATE_LOCATION service according to an implementation.

FIGS. 29A-29C illustrate an example description of MAP_UPDATE_GPRS_LOCATION service according to an implementation.

FIGS. 30A-30C illustrate an example description of MAP-INSERT-SUBSCRIBER-DATA service according to an implementation.

FIGS. 31A and 31B illustrate an example description of MAP-REPORT-SM-DELIVERY-STATUS service according to an implementation.

FIG. 32 illustrates an example description of mobile service data type according to an implementation.

Like reference numbers and designations in the various drawings indicate like elements.

DETAILED DESCRIPTION

Figure 1:
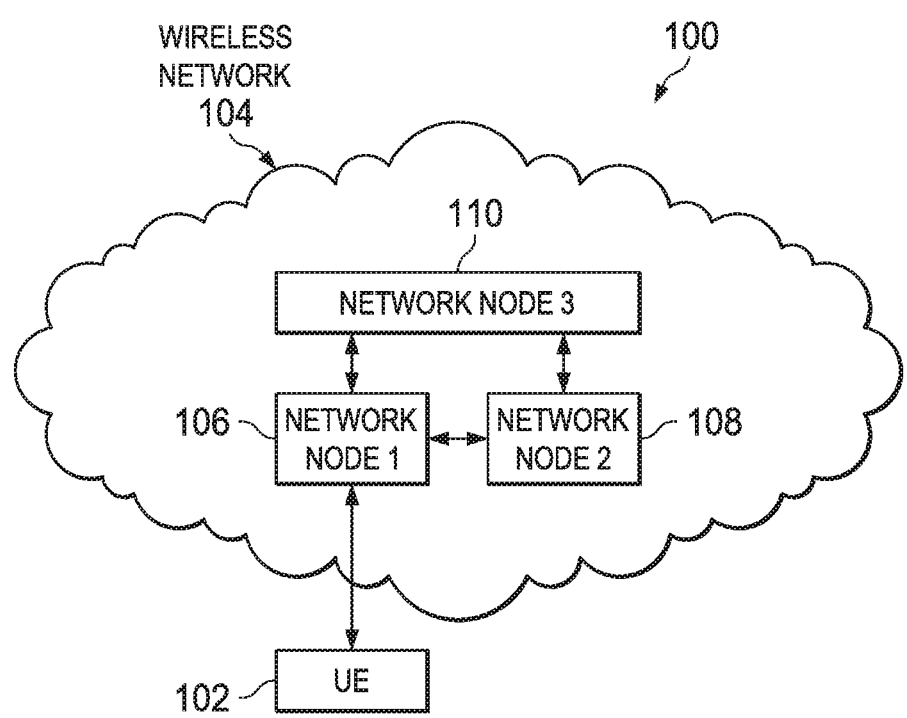
FIG. 1 is an example wireless communication system that uses optimized short message transport to transfer data in a CIoT environment according to an implementation.

The present disclosure is directed to optimized short message transport for transferring data in a CIoT environment. In some cases, CIoT devices may have limited power supply, e.g., powered by batteries. Examples of CIoT devices with limited power supply may include environmental monitoring sensors that are randomly placed in a geographical area to monitor air or water quality. In some cases, in order to deliver data up to 140 bytes/octets using SMS, it may take a large number of messages between the CIoT device and the network. In some cases, if Internet Protocol (IP)-based SMS is involved, even more messages may be needed and those messages maybe significantly bigger, e.g. using IP multimedia subsystem (IMS) to transport short messages. For example, when there is no data transfer, the CIoT device may be powered off or in a low battery consumption state and not connected to the network. When the CIoT device determines that there is a need to contact the network to either send, receive, or send and receive data, the CIoT device may power on or back to a normal battery consumption state and connect to the network. In order to connect to the network, the device may need to perform an attach procedure to register with the network. In some cases, a complete attach procedure may be performed before a short message (SM) can be delivered. To improve power efficiency of the CIoT device, an efficient short message transport with a reduced number of messages may be desirable. Reducing the number of messages may reduce the amount of time that the device connects to the network and hence save the power. Reducing the number of messages may also free up network resources so that more CIoT devices may be served by the network.

In some cases, a short message may be included in a message associated with an attach procedure to reduce the number of messages. However, in some cases, including a short message in another message may significantly increase the overall message size due to excessive protocol overhead. For example, if IP-based SMS is involved, the overall message size may be increased significantly due to various protocol headers. Therefore, it is desirable to have a small message size when including the short message. The device may use less power to process a message of a small size. Network resources may also be efficiently used by reducing message sizes.

To reduce the number of messages, the optimized short message transport may include data in a short message and include the short message in the messages associated with the attach procedure. In this case, the data may be delivered during the attach procedure without a bearer setup. In some cases, as discussed below, the CIoT device may disconnect from the network even before the attach procedure is completed if there is no data to be delivered to the device. To reduce the message size, the optimized short message transport may include data in SMS Protocol Data Units (PDUs) and include the SMS PDUs in the messages associated with the attach procedure without involving excessive protocol overhead.

FIG. 1 is an example wireless communication system 100 that uses optimized short message transport to transfer data in a CIoT environment according to an implementation. In some implementations, the attach procedure may be performed for a user equipment (UE, also known as CIoT device) to connect to the network. The attach procedure may include an authentication procedure and a location update procedure. The authentication procedure may be used for the UE and the network to perform mutual authentication of each other to avoid irresponsible usage of the network. The location update procedure may be used for the UE to update the location to the network and for the network to retrieve the services to which the UE is subscribed to, which could be, but not limited to at that location, such as roaming services.

In the example communication system 100, a first network node may receive an attach request message from a UE. The attach request message may include short-message data. The short-message data may be an SMS PDU, such as one of an SMS-SUBMIT PDU, an SMS-COMMAND PDU, an SMS-DELIVER-REPORT PDU, or an SMS-SUBMIT-REPORT PDU.

In the attach request message, the UE may include an indication of a type of data service that the UE requested. The type of data service may be one of but not limited to mobile origination (MO), mobile termination (MT), or mobile origination and termination. Mobile origination may refer to the service of the UE sending data to the network. Mobile termination may refer to the service of the UE receiving data from the network. Mobile origination and termination may refer to the service of the UE both sending and receiving data to and from the network. In the attach request message, the UE may also indicate that the UE request not to transition to a connected mode. Examples of MO, MT could be but not limited to MO SMS, MT SMS, etc.

In some implementations, the first network node may send a second message to a second network node. The second message may include an indication of the type of data service the UE requested. The second message may be one of an authentication request or a location update. If the UE requests at least mobile termination service (e.g., mobile termination or mobile origination and termination), the second network node may provide the information of whether there are mobile-terminated messages pending for the UE and/or the number of pending messages. If the UE requests at least mobile origination service (e.g., mobile origination or mobile origination and termination), the second network node may provide an address of a short message service center. In some implementations, the short-message data included in the attach request message may not need to include an address of a short message service center.

In some implementations, the first network node may receive from the second network node a short-message data response message. The short-message data response message may include at least one of an address of a short message service center, an indication that indicates no mobile-terminated message is pending for the UE, an indication that indicates a number of mobile-terminated messages pending for the UE, or a short-message entity destination address, e.g., an international telecommunication union telecommunication (ITU-T) E.164 address (which may also be known as an Mobile Station International Subscriber Directory Number (MSISDN) or MSISDN number), session initiation protocol (SIP) uniform resource identifier (URI), etc. The short-message data response message may be an insert subscriber data (ISD). The ISD may be a message associated with the location update procedure.

In some implementations, the first network node may transmit an attach response message to the UE. The attach response message may include an indicator indicating whether a mobile-terminated message is pending for the UE and/or the number of pending messages. The attach response message may also include the mobile-terminated message.

In some implementations, the first network node may receive the short-message data response message from the second network node. Based on the address of the short message service center included in the short-message data response message, the first network node may determine the short message service center. The first network node may transmit the short-message data from the UE to the short message service center.

In some implementations, the first network node may transmit an authentication request to the UE. The authentication request may indicate whether a mobile-terminated message is pending for the UE. For example, if the UE requested mobile termination and there is no pending message for the UE, the UE may disconnect from the network without performing the remaining authentication and attach procedures.

Using optimized short message transport to transfer data according to methods and systems described herein may provide one or more advantages. For example, the optimized short message transport may deliver the data during the attach procedure without a bearer setup. Having the UE indicate to the network the type of data service may enable the network to further optimize behavior. For example, if the UE requests mobile termination and there is no message pending for the UE, the network may let the UE disconnect from the network without finishing the authentication and attach procedures. Reducing the time that the UE connects to the network may significantly save the UE power and make the network resources available to serve more UEs. To reduce message size, data may be included in SMS PDUs and sent with the messages associated with the attach procedure without involving excessive protocol overhead. The UE saves battery power when processing a message with a reduced message size. In some cases, if the UE requests at least mobile origination service, the UE may not include the SMS service center (SMSC) address in the message. Instead, the network may provide the SMSC address. Removing SMSC address may further reduce the message size.

In some implementations, unstructured supplementary service data (USSD) may also be used to deliver the small amount of data in a CIoT environment. A USSD message may include up to 182 alphanumeric characters. The optimized short message transport described for SMS in this application may also apply to USSD.

In some implementations, the service of mobile origination may be referred to SMS/USSD origination. The service of mobile termination may be referred to SMS/USSD termination. The service of mobile origination and termination may be referred to SMS/USSD origination and termination.

At a high level, the example wireless communication system 100 includes a wireless communication network 104, which includes or is communicably coupled with a network node 1 106, a network node 2 108, and a network node 3 110. The example wireless communication system 100 also includes a UE 102 that connects to the network node 1 106. The UE 102 may be a CIoT device that sends and/or receives infrequent and small amount of data. In some implementations, a communications system can include additional or different components and features and can be configured in a different manner than the example system 100 shown in FIG. 1. For example, one UE is shown in FIG. 1 for clarity and brevity, but many UEs can be included in the system 100.

The network node 1 106 may be a Mobility Management Entity (MME), a Serving General Packet Radio Service (GPRS) Support Node (SGSN), CIoT Signaling Gateway Node (C-SGN), Mobile Switching Center (MSC) and MME connected together, or others network nodes or entities. The UE may connect to the network node 1 106 via a base station or evolved Node B (eNB). The network node 1 106 may perform mobility management functions for the UE 102 and may have the knowledge of the location of the UE 102.

The network node 2 108 may be a Home Location Register (HLR), Home Subscriber Server (HSS), Authentication Center (AuC), Authentication, Authorization, and Accounting (AAA) server, Mission Critical Push To Talk (MCPTT) Server, MCPTT user data server, or other network nodes or entities. As discussed in detail below, the network node 2 108 may have the knowledge whether there are messages pending for the UE 102 and/or the number of messages pending. The network node 2 108 may also have the knowledge of the address of the network node 3 110. The network node 2 108 may include authentication function and subscriber database. In some implementations, the address of the network node 3 110 may be stored in the subscriber database. In a CIoT environment, the UE may send data to a fixed network node 3. For example, if the UE is a smart utility meter, it is likely that the UE may send utility usage reports to the server of the utility provider and that server may be associated with a fixed network node 3 110.

The network node 3 110 may be SMS Gateway Mobile Services Switching Center (SMS-GMSC), SMS Inter Working Mobile Switching Center (SMS-IWMSC), SMS router, Short Message Service-Service Centre (SMS-SC or SMSC), or other network nodes or entities. The network node 3 110 may be responsible for storing and forwarding short messages. For example, for mobile-terminated SMS, the network node 3 110 may store the short messages and forward to the UE 102 when the UE 102 is available to receive the short messages. For mobile-originated SMS, the network node 3 110 may store the short messages from the UE 102 and forward to the destination server or external networks.

In operation, the UE 102 may receive an indication from the wireless network 104 indicating whether the optimized short message transport is supported by the wireless network 104. If supported, the indication may further indicate which optimized short message transport the network supports (e.g., SMS over attach, USSD over attach, etc.). In some implementations, the indication could be implicit by discovery of a radio access technology (RAT) that is known to support the optimized short message transport. In some other implementations, the indication is broadcast to the UE 102 by the wireless network 104. Alternatively, the UE may not receive the indication and try the procedure of the optimized short message transport anyway, in which case the UE may store whether or not the procedure was successful. This storage may be used later when there is further data to send to the network.

When the UE 102 determines that there is a need to either send, receive, or send and receive data, the UE 102 may power on or back to the normal battery consumption state and connect to the wireless network 104. In order to connect to the wireless network 104, the UE 102 may need to perform an attach procedure to register with the wireless network 104.

The UE 102 may send an attach request message to the network node 1 106. In one embodiment, in the attach request message, the UE 102 may include an indication of the type of data service that the UE 102 requests. The type of data service may be one of but not limited to mobile origination, mobile termination, or mobile origination and termination. For example, if the UE 102 is a smart utility meter and would like to send the utility usage report to the utility provider, the UE 102 may indicate mobile origination in the attach request message. If the UE 102 connects to the network 104 to check for system updates or notifications, the UE 102 may indicate mobile termination in the attach request message. If the UE 102 would like to both send and receive data, the UE 102 may indicate mobile origination and termination. The UE 102 may have different reasons each time it wakes up and connects to the network 104. Depending on the reason, the UE 102 may sometimes indicate mobile origination, sometimes mobile termination, and sometimes mobile origination and termination. In some implementations, including the indication of the type of data service in the attach request message may also notify the network 104 that the UE 102 wants to attach to the network without performing a bearer setup.

If the UE 102 has data to send (e.g., mobile origination or mobile origination and termination), the UE 102 may include the data in an SMS PDU. The UE 102 may include the SMS PDU in the attach request message and send the attach request message to the network node 1 106. In some implementations, the UE 102 may not include the address of the network node 3 110 (e.g., SMSC) in the SMS PDU. As discussed in more detail below, the network node 1 106 may obtain the address of the network node 3 110 (e.g., SMSC) from the network node 2 108. In the attach request message, the UE 102 may also indicate that the UE 102 request not to transition to a connected mode after the attach procedure.

In some implementations, if the UE 102 requests mobile termination, the UE 102 may send an indication for SMS attach only and not include an SMS PDU in the attach request message.

The network node 1 106 may send a message to the network node 2 108 which includes the indication of the type of data service the UE 102 requested. The message may be an authentication request associated with the authentication procedure or a location update message associated with the location update procedure. Depending on the type of data service the UE requested, the network node 2 108 may provide related information. For example, if the UE requests at least mobile origination service (e.g., mobile origination or mobile origination and termination), the network node 2 108 may provide the address of the network node 3 110 (e.g., SMSC). If the UE 102 requests at least mobile termination service (e.g., mobile termination or mobile origination and termination), the network node 2 108 may provide the information of whether there are messages pending for the UE 102 and/or the number of pending messages. If there are pending messages for the UE 102 and the UE 102 requested at least mobile termination service, the network node 2 108 may notify the network node 3 110 that the UE 102 is available to receive the pending messages, and in turn, the network node 3 110 may forward the pending messages to the network node 1 106.

The network node 2 108 may send a short-message data response message to the network node 1 106 and provide information related to the data service the UE 102 requested. The short-message data response message may be an insert subscriber data (ISD) message associated with the location update procedure. If the UE 102 requested at least mobile termination service, the short-message data response message may indicate whether there is a message pending for the UE 102 and/or the number of pending messages. If the UE 102 requests at least mobile origination service, the short-message data response message may include the address of the network node 3 110 so that the network node 1 106 may forward the mobile-originated data to the network node 3 110. In some implementations, the short-message data response message may be an authentication vectors response message associated with the authentication procedure that may indicate whether there are pending messages for the UE and/or the number of pending messages.

In some implementations, the network node 1 106 may send an authentication request to the UE 102. The authentication request may indicate whether there is a message pending for the UE 102. If there is no pending message for the UE 102 and the UE 102 requested mobile termination, the UE 102 may disconnect from the network without performing the remaining authentication procedure and attach procedure to save power.

In some implementations, after successful authentication, the network node 1 106 may transmit an attach response message to the UE 102. The attach response message may indicate whether there are mobile-terminated messages pending for the UE 102. The attach response message may also include the mobile-terminated message which includes the data to be delivered to the UE 102. In some implementations, if the data can be fit into the single attach response message, the attach response message may be an attach reject and the UE 102 may disconnect from the network after receiving the data from the attach reject.

FIGS. 2-9 and associated descriptions provide additional details for example implementations. One skilled in the art will appreciate that the implementations can be mixed and matched.

Turning to a general description of the elements, a UE may be referred to as a mobile electronic device, user device, mobile station, subscriber station, portable electronic device, mobile communications device, wireless modem, wireless terminal, mobile equipment, session initiation protocol (SIP) user agent, set-top box, test equipment, embedded modem, or CIoT device. Examples of a UE may include a cellular phone, personal data assistant (PDA), smart phone, laptop, tablet personal computer (PC), pager, portable computer, portable gaming device, wearable electronic device, or other mobile communications device having components for communicating data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 104 may include one or a plurality of radio access networks (RANs), other access networks such as fixed Ethernet or IEEE 802.11 WLAN, core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evolution (LTE), or LTE-Advanced. In some instances, the core networks may be evolved packet cores (EPCs). The core networks may include Mobility Management Entity (MME), a Serving General Packet Radio Service (GPRS) Support Node (SGSN), CIoT Signaling Gateway Node (C-SGN), Mobile Switching Center (MSC) and MME connected together, Home Location Register (HLR), Home Subscriber Server (HSS), Authentication Center (AuC), PS-UDF, Authentication, Authorization, and Accounting (AAA) server, SMS Gateway Mobile Services Switching Center (SMS-GMSC), Inter Working Mobile Switching Center (IWMSC), SMS router, SMSC, or other network nodes or entities.

The wireless network 104 may be a CIoT network dedicated to serve CIoT devices. In some implementations, the CIoT network may have its own frequency spectrum and network nodes. In some implementations, the CIoT network may be part of another network (e.g., a GSM, UMTS, CDMA2000, UMTS, or LTE network) and share the frequency spectrum and network nodes with the other network.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate.

Figure 2:
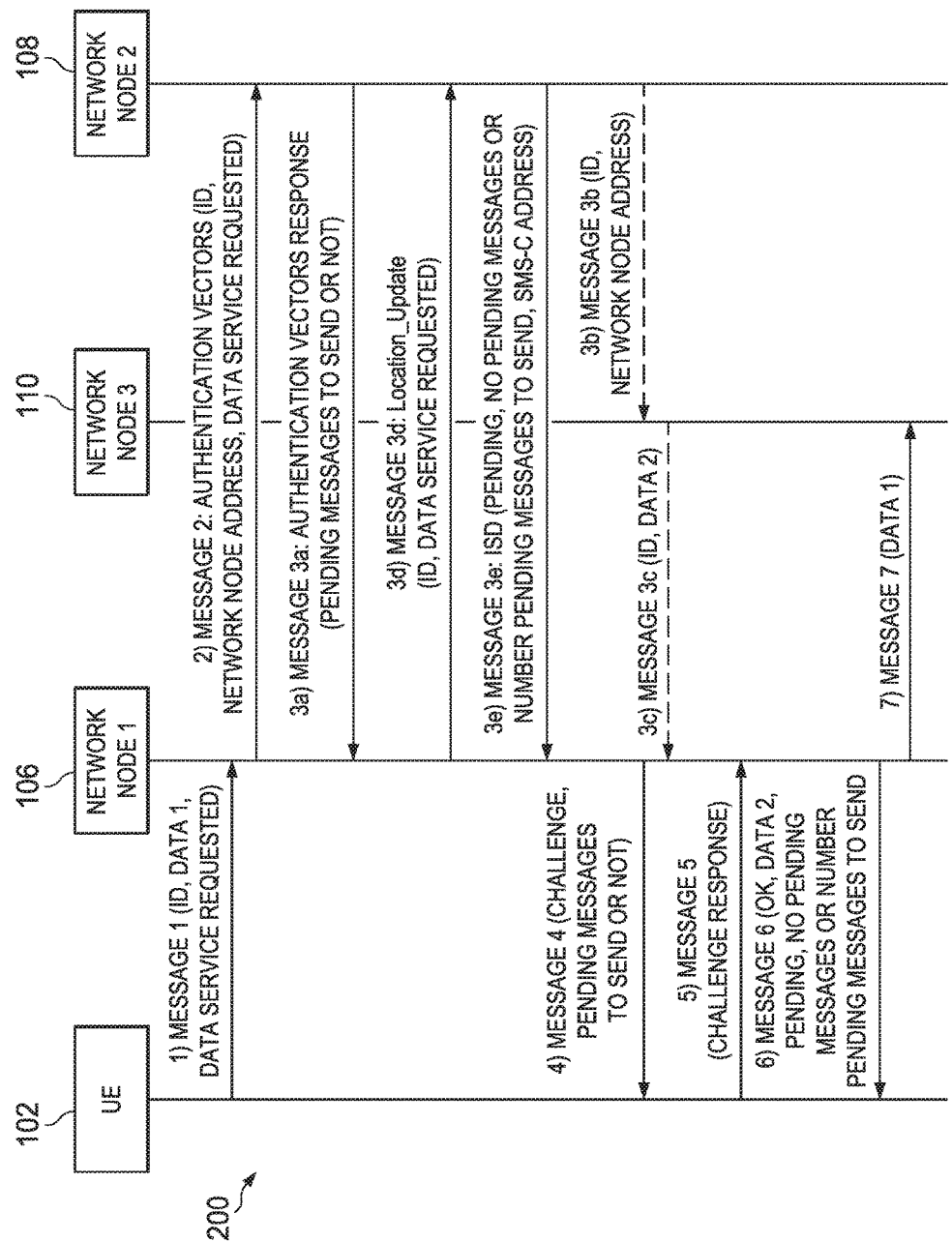
FIG. 2 is a data flow diagram illustrating an example process for using optimized short message transport to transfer data in a CIoT environment according to an implementation.

FIG. 2 is a data flow diagram illustrating an example process 200 for using optimized short message transport to transfer data in a CIoT environment according to an implementation. The data flow diagram includes the UE 102, the network node 1 106, the network node 2 108, and the network node 3 110. The data flow diagram also includes Messages 1, 2, 3a-3e, and 4-7 corresponding to operations 1, 2, 3a-3e, and 4-7. One skilled in the art will appreciate that operations 1, 2, 3a-3e, and 4-7 may be concurrent, simultaneous, or overlapping events. The following table lists the possible network nodes for the network node 1 106, the network node 2 108, and the network node 3 110. The table also lists the possible messages for Messages 1, 2, 3a-3e, and 4-7 corresponding to operations 1, 2, 3a-3e, and 4-7.

TABLE 1

Description of network nodes and messages

| Descriptive term | Possible node/message | Characteristics |
| --- | --- | --- |
| UE | ME, SIP UA, set-top box, test equipment, embedded modem | |
| Network Node 1 | MME, SGSN, C-SGN, MSC and MME connected together (e.g., using a SGs interface), etc | |
| Network Node 2 | HLR, HSS, AuC, AAA, MCPTT user data server, MCPTT server | May include Authentication function Subscriber database |
| Network Node 3 | SMS-GMSC, IWMSC, SMS Router, SMSC | |
| Message 1 | Attach Request, | The message includes an identity of the subscriber the data to be conveyed in the message, e.g., Data 1 The UE may not need to go into connected mode. The message may trigger authentication function to be performed. |
| Message 2 | MAP_SEND_AUTHENTICATION_INFO request/indication Diameter Authentication-Information-Request (AIR) | |
| Message 3a | MAP_SEND_AUTHENTICATION_INFO response/confirm Diameter Authentication-Information-Answer (AIA) | |
| Message 3b | MAP-ALERT-SERVICE-CENTRE request/indication MAP-INFORM-SERVICE-CENTRE request Diameter Alert-Service-Centre-Request (ALR) | |
| Message 3c | MAP-MT-FORWARD-SHORT-MESSAGE request/indication Diameter MT-Forward-Short-Message-Request (TFR) SIP MESSAGE method SIP INVITE method | |
| Message 3d | MAP_UPDATE_LOCATION request/indication MAP_UPDATE_GPRS_LOCATION request/indication Diameter Update-Location-Request (ULR) | |

TABLE 1-continued

Description of network nodes and messages

| Descriptive term | Possible node/message | Characteristics |
|---|---|---|
| Message 3e | MAP-INSERT-SUBSCRIBER-DATA request/indication<br>Diameter Insert Subscriber Data-Request (IDR)<br>MAP_UPDATE_LOCATION response/confirm<br>MAP_UPDATE_GPRS_LOCATION response/confirm<br>Diameter Update-Location-Answer (ULA) | |
| Message 4 | Authentication Request<br>Attach Reject | |
| Message 5 | Authentication Response, Authentication Reject | |
| Message 6 | Attach Reject, Attach Accept, Detach Request | |
| Message 7 | MAP-MO-FORWARD-SHORT-MESSAGE request/indication<br>Diameter MO-Forward-Short-Message-Request (OFR)<br>SIP MESSAGE method<br>SIP INVITE method | |
| Message 10 | MAP-REPORT-SM-DELIVERY-STATUS request/indication | |
| Message 11 | MAP-REPORT-SM-DELIVERY-STATUS response/confirm | |

Data sent from the UE 102 to the network may be referred to Data 1 (i.e., mobile-originated data). Data sent from the network to the UE 102 may be referred to Data 2 (i.e., mobile-terminated data). In some implementations, Data 1 may be one of the following SMS PDUs: an SMS-SUBMIT PDU, an SMS COMMAND PDU, an SMS DELIVER REPORT PDU, or an SMS SUBMIT REPORT PDU. Data 2 may be one of the following SMS PDUs: an SMS-DELIVER PDU, an SMS STATUS REPORT PDU, an SMS DELIVER REPORT PDU, or an SMS SUBMIT REPORT PDU.

As shown in FIG. 2, before operation 1, the UE 102 may be in idle mode or in a low battery consumption state and the UE 102 is not connected or attached to the network. The UE 102 may determine that it needs to contact the network to either send, receive, or send and receive data. The UE 102 may receive an indication that the network supports sending data in an optimized way (e.g., optimized short message transport for SMS or USSD) in its first Non-Access Stratum (NAS) signalling message sent to the network. In some implementations, the indication may be implicit by the RAT type of the network. For example, the optimized short message transport may be supported on a particular RAT. The UE 102 may also receive the indication via a broadcast message from the network that includes a code point(s) that identifies the optimized short message transport supported. The optimized short message transport may be one or more of SMS over attach, USSD over attach, or SMS/USSD over attach.

At operation 1, the UE 102 may send a Message 1 to the network node 1 106 (e.g., C-SGN, MME, etc.). Message 1 may be an attach request message. Message 1 may include an identifier identifying the UE 102. The identifier may be a type of private identity such as an Internal Mobile Subscriber Identity (IMSI) or a Globally Unique Temporary Identity (GUTI). If the UE 102 wants to send data, the mobile-originated data may be included in an SMS PDU. In some implementations, Message 1 may also include an indication of the type of data service the UE 102 requested. The data service may be one of but not limited to mobile origination, mobile termination, or mobile origination and termination. In some implementations, including the indication of the type of data service in Message 1 may notify the network that the UE 102 wants to attach to the network without performing a bearer setup.

In some implementations, Message 1 may not include the following short message information elements: short message service center address (SMSC address) and short message entity destination address (SME TP-DA). In the SME TP-DA, Type of Number (TON) and Numbering Plan Identification (NPI) may be both set as "unknown" with address length of zero digits. One skilled in the art will appreciate that any code point settings in TON and NPI could be used as long as the network knows that these settings imply no SME TP-DA is included.

In some implementations, Message 1 may include an indication that the UE 102 does not want to transition into CONNECTED mode after the attach procedure. In some implementations, the indication may be implicitly derived from the data service the UE 102 requested.

In some implementations, the indication of the data service requested may be a new code point in an existing information element, a new information element, or could be a specific set (1 to many) characters in the access point name (APN) information element. In some implementations, the code point for the indication of the data service the UE requested are such that the network node 1 106 does not set up an IP bearer.

Upon the network node 1 106 receiving Message 1, if the UE 102 needs to be authenticated, then the network node 1 106 performs authentication procedures as shown in operations 2a, 3a, 4, and 5.

At operation 2, the network node 1 106 may send a Message 2 to the network node 2 108 (e.g., HSS etc.). Message 2 may be an authentication request. Message 2 may include the UE identifier (e.g., the private identity such as IMSI, GUTI) that was received in Message 1 as well as the address of the network node 1 106 (e.g., Global Title, E.164 number, uniform resource locator, etc.). In some implementations, Message 2 may also include the type of data service the UE requested that could have been received in Message 1.

In some implementations, the network node 2 108 includes an authentication function, e.g., HSS with authentication function. When the network node 2 108 receives Message 2 and determines that the UE 102 is not authorized to perform the requested data service, the network node 2 108 may respond with a reject message back to the network node 1 106.

When the network node 2 108 receives Message 2 and determines that the UE 102 is authorized to perform the requested data service, the network node 2 108 may perform either one or both of the following: (1) The network node 2 108 may generate or create authentication vectors to be sent to the UE 102; (2) If the network node 2 108 has an indication that there are pending messages to be sent to the UE 102 and the UE 102 has indicated that it is connecting to the network for at least mobile termination service, the network node 2 108 may send a notification to the network node 3 110 (e.g., SMSC etc.) to indicate that the UE 102 is available to receive the pending messages. For example, as discussed below, the network node 2 108 may send a Message 3b to the network node 3 110.

At operation 3a, the network node 2 108 may send a Message 3a to the network node 1 106. Message 3a may be a short-message data response. Message 3a may include the authentication vectors generated by the network node 2 108. Message 3a may also include an indication whether there are pending messages to be delivered to the UE 102 and/or the number of messages pending which could range from 0 to many.

In some implementations, if the UE 102 requested mobile termination and there are no pending messages for the UE 102, Message 3a could either include an indication that there are no pending messages or could be a reject message with an optional cause value "no pending messages."

At operation 3b, the network node 2 108 may send a Message 3b to the network node 3 110. In some implementations, Message 3b is sent because of receipt of Message 2 and the data service requested indicated in Message 2 was at least mobile termination service. In some implementations, Message 3b is sent because of receipt of Message 3d, as discussed in detail below, and the data service requested indicated in Message 3d was at least mobile termination service. In some implementations, Message 3b is sent if the UE requested at least mobile termination service and the network node 2 108 knows that there are pending messages for the UE. In some implementations, the purpose of Message 3b is to notify the network node 3 110 that the UE 102 is available to receive the pending messages so that the network node 3 110 may send the pending messages to the network node 1 106 and the network node 1 106 may further send the pending messages to the UE 102.

Message 3b may include a UE identifier for the UE 102. The UE identifier in Message 3b may be a different identifier from the one in Messages 1 and 2. In some implementations, the UE identifier in Message 3b may be a public UE identity such as Mobile Station International Subscriber Directory Number (MSISDN) or uniform resource identifier (URI). Message 3b may also include the address of the network node 1 106 (e.g., Global Title, E.164 number, URL, etc.). In some implementations, by conveying the address of the network node 1 106 (e.g., C-SGN or MME which is responsible for UE mobility functions and has knowledge of the UE location), the network node 3 110 may know how to send the pending messages to the UE 102. For example, the network node 3 110 may send the pending messages to the network node 1 106 and the network node 1 106, which knows the UE location, may further forward the pending messages to the UE 102.

At operation 3c, the network node 3 110 (e.g., SMSC) may send one or more Message 3c to the network node 1 106. Upon receiving Message 3b indicating that the UE 102 is available to receive pending messages, the network node 3 110 may create Message 3c. Depending on the amount of data to send, the network node 3 110 may send one Message 3c or a plurality of Message 3c. Each Message 3c may include a UE identifier (e.g., the public identity such as MSISDN or URI) and the data to be delivered to the UE. The data to the UE may be included in SMS PDUs. After receiving Message 3c, the network node 1 106 may store the data for the UE 102.

At operation 3d, the network node 1 106 may send a Message 3d to the network node 2 108. Message 3d may be a location update. If Message 2 did not include the type of data service the UE requested or Message 3a does not include the indication whether there is pending messages for the UE, the network node 1 106 may send Message 3d. Message 3d may include one or more of the UE identifier (e.g., the private identity IMSI or GUTI) that was received in Message 1, the address of the network node 1 106 (e.g., Global Title, E.164 number, URL, etc.), or the type of data service the UE requested. One skilled in the art will appreciate that operation 3d will normally happen after operation 5.

When the network node 2 108 receives Message 3d, if the network node 2 108 has an indication that there are pending messages to be sent to the UE and the UE has indicated that it is connecting to the network for at least mobile termination service, the network node 2 108 may send a notification to the network node 3 110 indicating that the UE is available to receive the pending data. For example, the network node 2 108 may send Message 3b to the network node 3 110.

At operation 3e, the network node 2 108 may send a Message 3e to the network node 1 106. Message 3e may be a short-message data response. Message 3e may include one or more of an indication that there are pending or no pending messages to be delivered to the UE, the number of messages pending which could range from 0 to many, the SMSC address to be used to send the mobile-originated data to, or the short message entity (SME) destination address to be used within the SMS message.

In some implementations, if the UE 102 requested mobile termination and there are no pending messages for the UE 102, Message 3e could either include an indication that there are no pending messages or could be a reject message with an optional cause value "no pending messages."

At operation 4, the network node 1 106 may send a Message 4 to the UE 102. In some implementations, the network node 1 106 sends Message 4 upon receiving Message 3a. Message 4 may not have to wait for Message 3d to be sent and Message 3e to be received. Message 4 may include the authentication vectors. Message 4 may also include the indication that there are pending or no pending messages to be delivered to the UE or the number of messages pending which could range from 0 to many.

In some implementations, if the UE 102 requested mobile termination and there are no pending messages for the UE 102, Message 4 could either include an indication that there are no pending messages or could be a reject message, for example, an attach reject with an optional cause value "no pending messages."

In some implementations, if Message 3a or Message 3e is a reject message with optional cause value "no pending messages," Message 4 may also be a reject message with an optional cause value "no pending messages."

Upon receiving Message 4, the UE 102 may perform the authentication based on the authentication vectors received in Message 4. Upon the UE 102 validating that the authentication challenge based on the authentication vectors is a legitimate one, if Message 4 includes an indication that there are pending messages and the UE requested at least mobile termination service, the UE 102 may store the indication of the pending messages and/or the number of pending messages, which could range from 0 to many. In some implementations, if Message 4 includes an indication that there is no pending message and the UE requested mobile termination, the UE 102 may not perform the rest of the authentication and attach process and return to IDLE state.

At operation 5, the UE 102 sends a Message 5 to the network node 1 106. For example, Message 5 may include the authentication response associated with the authentication vectors received in Message 4. Based on the authentication response received in Message 5, the network node 1 106 may determine whether the authentication process is successful or not. For example, the authentication process is successful if the authentication response received in Message 5 matches the authentication response stored in the network node 1 106 which was received from Message 3a.

At operation 6, the network node 1 106 may send a Message 6 to the UE 102. Message 6 may be an attach response message. Upon a successful authentication, if the UE requested at least mobile termination service (e.g., mobile termination, mobile origination and termination), the network node 1 106 may determine if there are pending messages to be delivered to the UE. For example, if the network node 1 106 has not received an indication in Message 3a or Message 3e indicating pending messages or the network node 1 106 has not received any Message 3c including pending messages, the network node 1 106 may determine that there is no pending message for the UE. If the network node 1 106 has pending messages stored from one or more received Message 3c, the network node 1 106 may determine that there are pending messages for the UE 102.

If the UE 102 requested at least mobile termination service and there is no pending message for the UE, and, if the UE has sent mobile-originated data in Message 1 and the mobile-originated data has been received by the network, then Message 6 could be an attach reject with indications indicating "successful receive of data" and "no pending terminated messages." After receiving the attach reject, the UE 102 may disconnect from the network.

If the UE 102 requested at least mobile termination service and there is no pending message for the UE, and, if network node 1 106 has received an indication in Message 1 indicating at least mobile origination service but no mobile-originated data was received, then Message 6 could be an attach reject with a cause value indicating an error. After receiving the attach reject, the UE 102 may detach or disconnect from the network and attempt the procedure in FIG. 2 again.

If the UE requested the service of mobile termination and there is no pending message for the UE, Message 6 could be an attach reject with cause "no pending terminated messages." After receiving the attach reject, the UE 102 may disconnect from the network.

If the UE requested at least mobile termination service and there are pending messages stored at the network node 1 106, and, if the mobile-terminated data that was received in the one or more Message 3c fits into a single Message 6, and, if the UE has sent the mobile-originated data in Message 1 and the mobile-originated data was received by the network, then Message 6 may include indications indicating "successful receive of data" and include the mobile-terminated data. In some implementations, Message 6 may be an attach reject and the UE 102 may disconnect from the network after receiving the mobile-terminated data from the attach reject.

If the UE requested at least mobile termination service and there are pending messages stored at the network node 1 106, and, if the mobile-terminated data that was received in the one or more Message 3c does not fit into a single Message 6, and, if an indication was received in Message 1 that UE wants to move into CONNECTED mode or no such indication was received, then the network node 1 106 may send either of the followings to the UE 102: (i) Message 6 (e.g., an attach accept); (ii) Message 6 (e.g., an attach accept) with an indication indicating pending data to be sent; (iii) Message 6 (e.g., an attach accept) with an indication of the number of pending messages to be sent back; (iv) Message 6 (e.g., an attach accept) including mobile-terminated data from one Message 3c, e.g., the first Message 3c received, and an indication that further data is to be sent or the number of pending messages to be sent back. In some implementations, if the UE 102 receives an attach accept, the UE 102 may revert to legacy handling for at least mobile termination services. The UE 102 may stay attached to the network until the UE 102 receives the number of short messages as identified in Message 4 or Message 6. In some implementations, the UE 102 may stay attached to the network for a period of time that is implementation-dependant or network-provided.

If the UE requested at least mobile termination service and there are pending messages stored at the network node 1 106, and, if the mobile-terminated data that was received in the one or more Message 3c does not fit into a single Message 6, and, if an indication was received in Message 1 that the UE 102 does not want to move into CONNECTED mode and stay in IDLE, then the network node 1 106 may send either of the followings to the UE 102: (i) Message 6 (e.g., an attach reject); (ii) Message 6 (e.g., an attach reject) with an indication that pending data to be sent; (iii) Message 6 (e.g., an attach reject) with an indication with number of pending messages to be sent back; (iv) Message 6 (e.g., an attach reject) including data from one Message 3c, e.g., the first Message 3c received, and an indication that further data is to be sent or the number of pending messages to be sent back. In some implementations, if the UE 102 receives an attach reject with an indication of pending messages or a number of pending messages to be sent, the UE 102 will then repeat the procedure in FIG. 2 from operation 1. When repeating the procedure, the UE 102 may request at least mobile termination service and optionally not send the indication of not to transition to a CONNECTED mode.

If the UE 102 moves into CONNECTED mode, the network node 1 106 may revert back to legacy SMS delivery behavior to deliver the pending messages. For pending short messages, this may be legacy SMS procedures to deliver the pending short messages. In some implementations, the network node 1 106 may not send any additional messages.

If in Message 1 the UE requested mobile origination, and, if mobile-originated data was sent in Message 1 and was received by the network, then Message 6 may include an indication indicating "successful receive of data."

If in Message 1 the UE requested mobile origination but no mobile-originated data was included in Message 1, then Message 6 may be sent with a cause value indicating an error "data not received."

In some implementations, for each successful message delivery for mobile-terminated data, the network node 1 106 may create a Call Detail Record (CDR) that includes an indication that could include any or none of the following: type of data received in Attach (e.g., SMS, USSD), data type within that type (e.g., SMS-DELIVER), or size of the data.

At operation 7, upon a successful authentication after operation 5, the network node 1 106 may send a Message 7 to the network node 3 110. Message 7 may include the mobile-originated data received from Message 1. In some implementations Message 7 may only be sent upon receipt of Message 3e.

In some implementations, if the mobile-originated data in Message 1 is an SMS message, the network node 1 106 may extract the SMS PDU (e.g., SMS-SUBMIT) and insert it into a MAP_MO_FORWARD_SHORT message. If the SMSC address was not received from the UE 102 in Message 1 and an SMSC address was received in Message 3e, the network node 1 106 may use the SMSC address that was received in Message 3e in Message 7. If an SME destination address was received in Message 3e, the network node 1 106 may insert the received SME destination address into the SMS-SUBMIT TP-DA information element that is sent in Message 7.

In some implementations, for each successful message delivery for mobile-originated data, the network node 1 106 may create a Call Detail Record (CDR) with an indication that could include any or none of the following: type of data received (e.g., SMS, USSD), data type within that type (e.g., SMS-SUBMIT), or size of the data.

In some implementations, the number of messages to send and/or receive by the UE before the UE detaches or disconnects from the network may include SMS messages that are marked as concatenated SMS messages.

Figure 3:
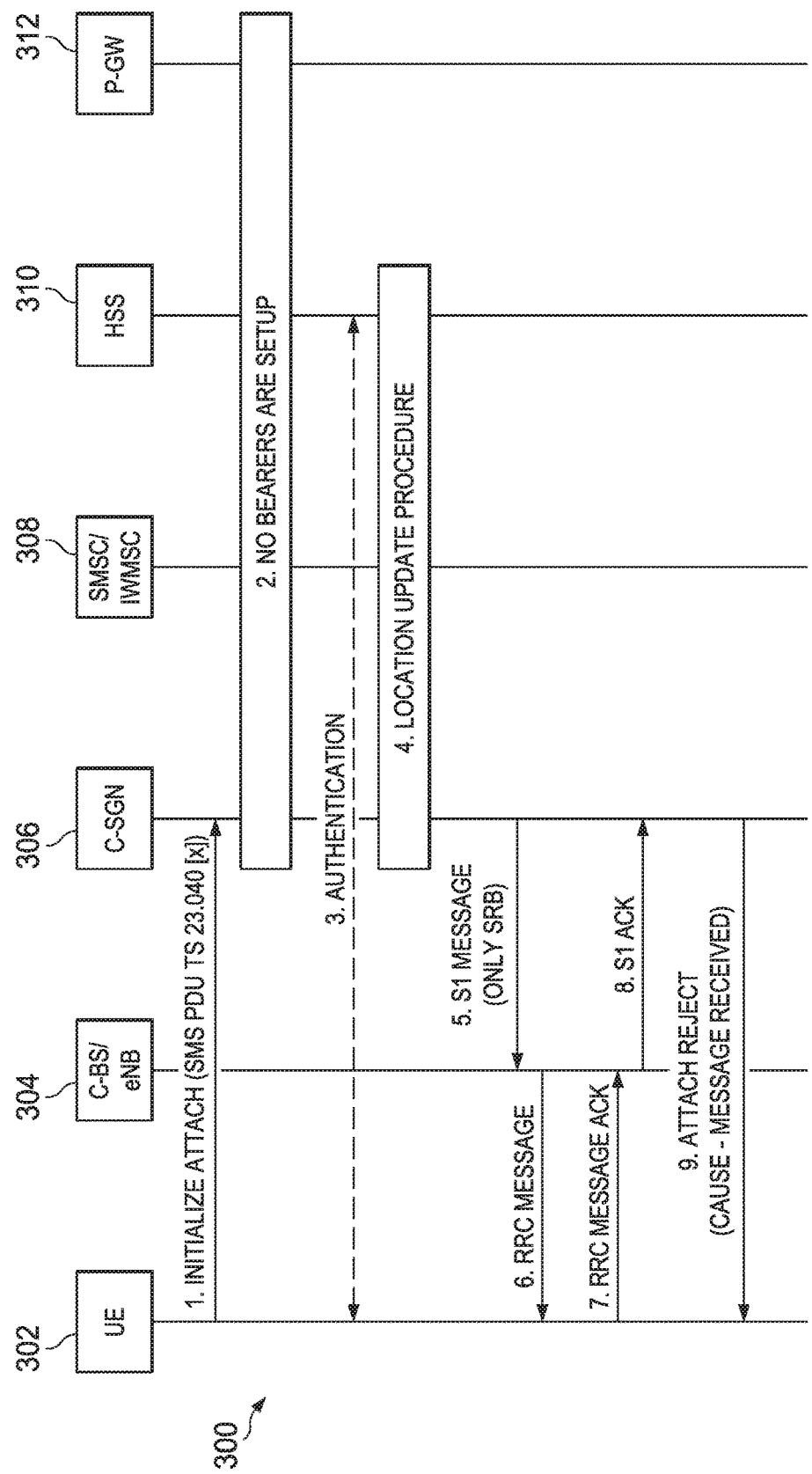
FIG. 3 is a data flow diagram illustrating an example process for using optimized short message transport to transfer mobile-originated data in a CIoT environment according to an implementation.

FIG. 3 is a data flow diagram illustrating an example process 300 for using optimized short message transport to transfer mobile-originated data in a CIoT environment according to an implementation. The data flow diagram includes a UE 302, a CIoT base station/evolved Node B (C-BS/eNB) 304, a C-SGN 306, an SMSC/IWMSC 308, an HSS 310, and a packet data network gateway (P-GW) 312. The C-BS/eNB 304 may provide radio connection with the UE 302. The C-SGN 306 may be the network node 1 106. The SMSC/IWMSC 308 may be the network node 3 110. The HSS 310 may be the network node 2 108. The P-GW 312 may connect the UE 302 with the various external data networks such as Internet. FIG. 3 illustrates the scenario that the UE 302 attaches to the network to send mobile-originated data without performing a bearer setup and the UE 302 includes the mobile-originated data in the SMS PDU.

At operation 1, the UE 302 sends initial attach with "MO SMS" in order to signify that it wants to register without creating a packet data network (PDN) connection and includes SMS PDU as specified in 3GPP TS 23.040 e.g. SMS-SUBMIT. This follows the 3GPP TS 23.401 attach procedure with an extra indicator "MO SMS" in order to indicate that the UE wants to attach without immediately establishing a PDN connection and includes an SMS PDU. The UE 302 may initiate a PDN connection set up at a later stage if needed. The "MO SMS" indicator indicates the data service of mobile origination.

At operation 2, the C-SGN 306 processes the initial attach and identifies that the UE does not want to establish a PDN connection and wants to send an MO SMS; therefore, it does not further follow the initial attach procedures towards the P-GW 312 as defined in TS 23.401.

At operation 3, the C-SGN 306 authenticates the UE 302 following normal procedures.

At operation 4, the C-SGN 306 performs a Location Update to the HSS 310 including the reason for Location Update, e.g., MO SMS. If the UE 302 is authorized to perform MO-SMS, then the HSS 310 will either send the subscription information to the C-SGN 306 or send back a Location Update acknowledgement with an indication that the UE 302 is authorized for MO SMS.

At operation 5, the C-SGN 306 establishes UE context indicating to RAN node that signaling radio bearer (SRB) is needed and without requesting data radio bearers (DRBs) to be established At operations 6 and 7, radio resource control (RRC) message establishes SRB.

At operation 8, S1 message is acknowledged.

At operation 9, the C-SGN 306 sends Attach Reject with "indication indicating SMS PDU was received and accept" to the UE 302.

At operation 10, the C-SGN 306 sends the SMS PDU using existing procedures to the SMSC 308.

Figure 4:
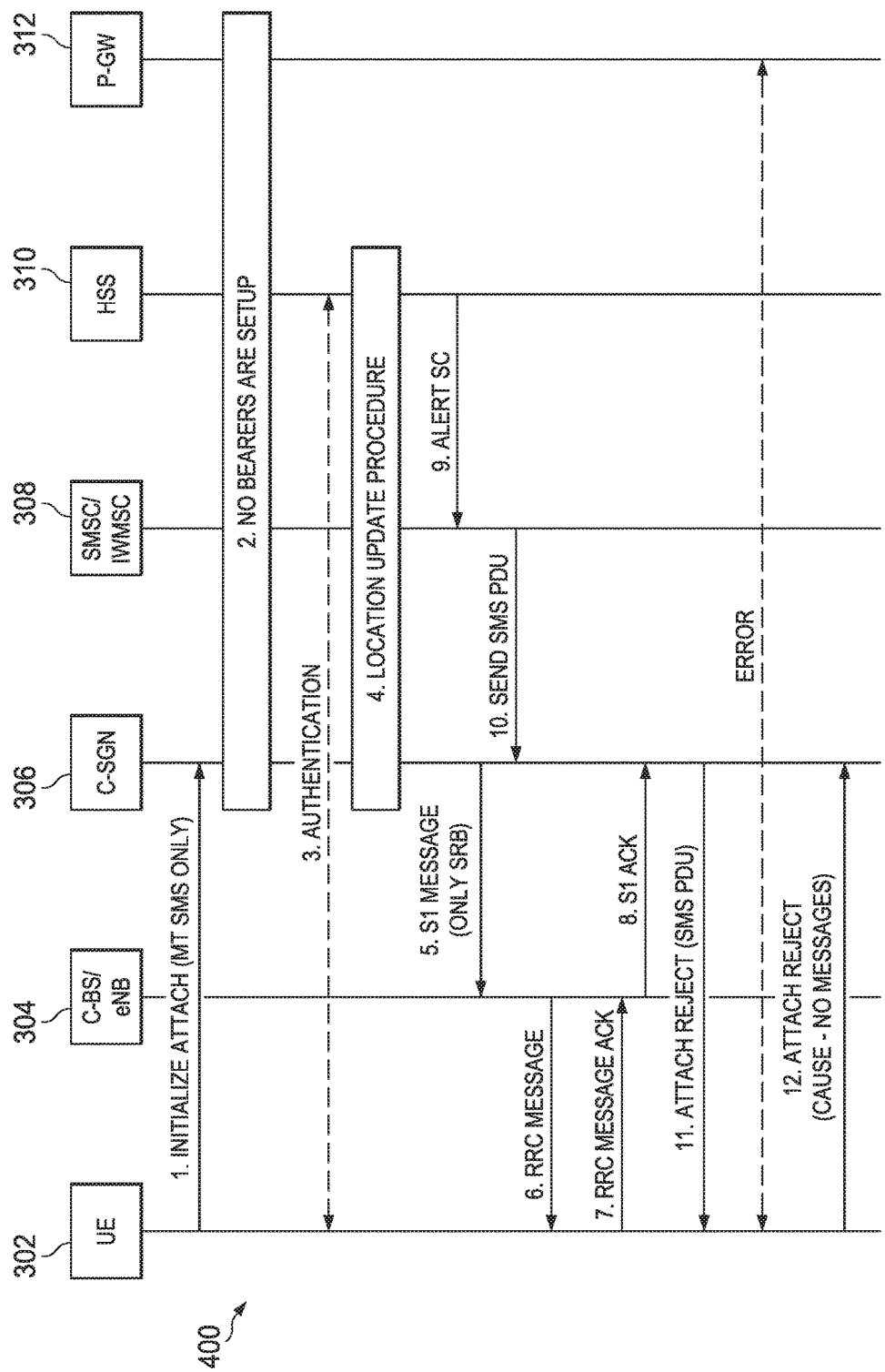
FIG. 4 is a data flow diagram illustrating an example process for using optimized short message transport to transfer mobile-terminated data in a CIoT environment according to an implementation.

FIG. 4 is a data flow diagram illustrating an example process 400 for using optimized short message transport to transfer mobile-terminated data in a CIoT environment according to an implementation. The data flow diagram includes a UE 302, a C-BS/eNB 304, a C-SGN 306, an SMSC/IWMSC 308, an HSS 310, and a P-GW 312. FIG. 4 illustrates the scenario that the UE 302 attaches to the network to determine if there is any mobile-terminated data. FIG. 4 also illustrates the scenario that the UE 302 attaches to the network to receive mobile-terminated data without performing a bearer setup and the mobile-terminated data can be fit into a single message.

At operation 1, the UE 302 sends initial attach with "MT SMS" in order to signify that it wants to register without creating a PDN connection. This follows the TS 23.401 attach procedure with an extra indicator "MT SMS" in order to indicate that the UE wants to attach without immediately establishing a PDN connection and wants a pending SM to be delivered. The UE 302 may initiate a PDN connection set up at a later stage if needed. The "MT SMS" indicator indicates the data service of mobile termination.

At operation 2, the C-SGN 306 processes the initial attach and identifies that the UE 302 does not want to establish a PDN connection and wants to receive MT SMS; therefore, it does not further follow the initial attach procedures towards the P-GW 312 as defined in TS 23.401.

At operation 3, the C-SGN 306 authenticates the UE 302 following normal procedures.

At operation 4, the C-CSGN 306 performs a Location Update to the HSS 310 including the reason for Location Update, e.g., MT SMS. If the UE 302 is authorized to perform MT-SMS, then the HSS 310 will inform the C-SGN 306 if there are or no pending messages to be delivered. If there are no messages, then operation 12 will be performed.

At operation 5, the C-SGN 306 establishes UE context indicating to RAN node that SRB is needed and without requesting DRBs to be established.

At operations 6 and 7, RRC message establishes SRB.

At operation 8, S1 message is acknowledged.

At operation 9, the HSS 310 alerts the SMSC 308 that the UE is available per procedures defined in 3GPP 29.002.

At operation 10, the SMSC 308 sends the SMS PDU to the C-SGN 306.

At operation 11, when the C-SGN 306 receives the SMS PDU from the SMSC 308, the C-SGN 306 sends Attach Reject with including the SMS PDU e.g. SMS-DELIVER as defined in 3GPP TS 23.040 to the UE 302.

At operation 12, the C-SGN 306 sends an Attach Reject including an indication that there are no messages to send.

Figure 5:
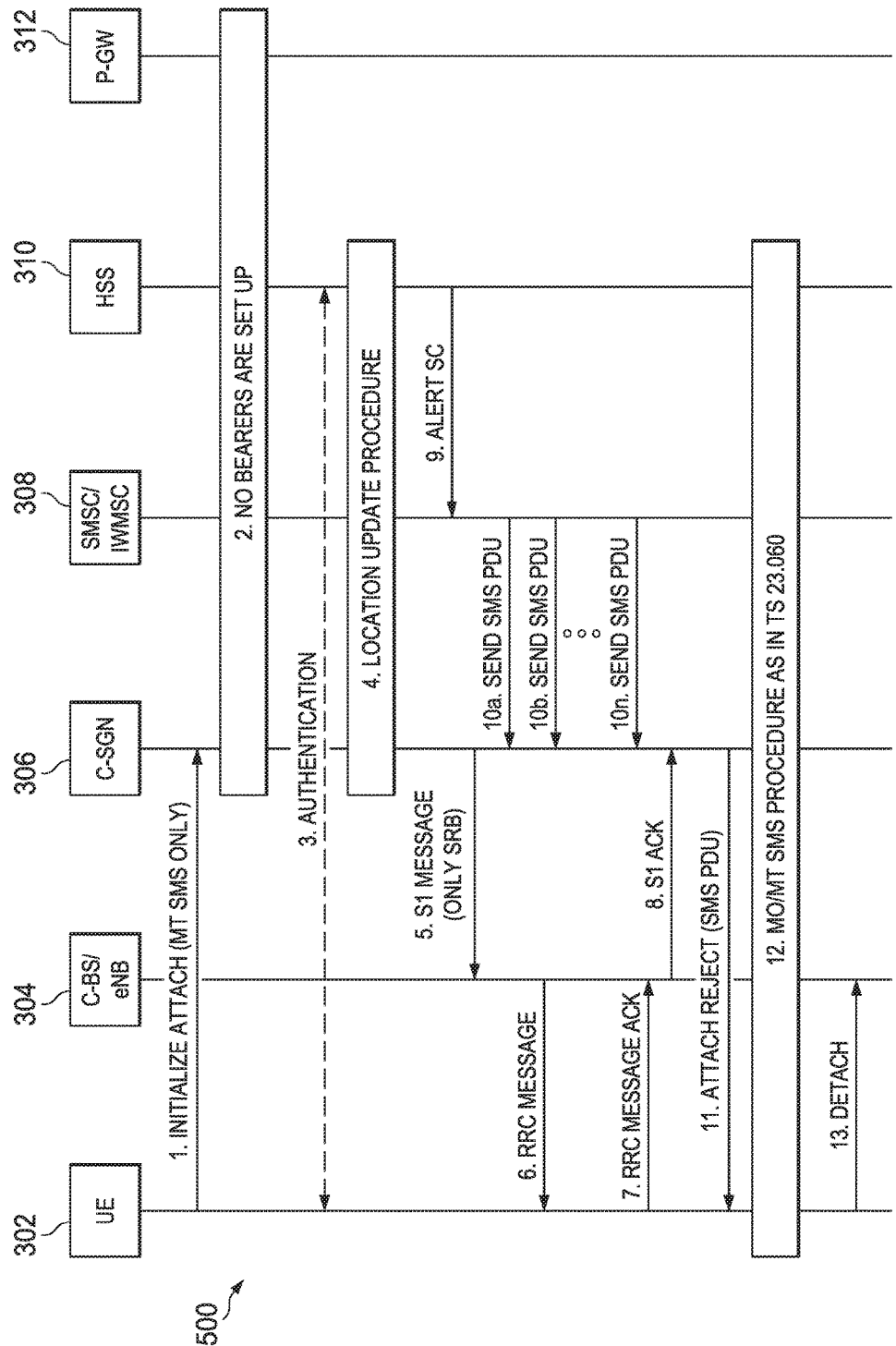
FIG. 5 is a data flow diagram illustrating another example process for using optimized short message transport to transfer mobile-terminated data in a CIoT environment according to an implementation.

FIG. 5 is a data flow diagram illustrating another example process 500 for using optimized short message transport to transfer mobile-terminated data in a CIoT environment according to an implementation. The data flow diagram includes a UE 302, a C-BS/eNB 304, a C-SGN 306, an SMSC/IWMSC 308, an HSS 310, and a P-GW 312. FIG. 5 illustrates the scenario that the UE 302 attaches to the network to determine if there is any mobile-terminated data. FIG. 5 also illustrates the scenario that the UE 302 attaches to the network to receive mobile-terminated data without performing a bearer setup and the mobile-terminated data cannot be fit into a single message.

At operation 1, the UE 302 sends initial attach with "MT SMS" in order to signify that it wants to register without creating a PDN connection. This follows the TS 23.401 attach procedure with an extra indicator "MT SMS" in order to indicate that the UE wants to attach without immediately establishing a PDN connection and wants a pending SM to be delivered. The UE 302 may initiate a PDN connection set up at a later stage if needed. The "MT SMS" indicator indicates the data service of mobile termination.

At operation 2, the C-SGN 306 processes the initial attach and identifies that the UE 302 does not want to establish a PDN connection and wants to receive MT SMS; therefore, it does not further follow the initial attach procedures towards the P-GW 312 as defined in TS 23.401.

At operation 3, the C-SGN 306 authenticates the UE 302 following normal procedures.

At operation 4, the C-SGN 306 performs a Location Update to the HSS 310 including the reason for Location Update, e.g., MT SMS. The HSS 310 will inform the C-SGN 306 that there are N messages to be sent to the UE.

At operation 5, the C-SGN 306 establishes UE context indicating to RAN node that SRB is needed and without requesting DRBs to be established.

At operations 6 and 7, RRC message establishes SRB.

At operation 8, S1 message is acknowledged.

At operation 9, the HSS 310 alerts the SMSC 308 that the UE 302 is available per procedures defined in 3GPP 29.002.

At operation 10a, the SMSC 308 sends the 1st SMS PDU to the C-SGN 306.

At operation 10b, the SMSC 308 sends the 2nd SMS PDU to the C-SGN 306.

At operation 10n, the SMSC 308 sends the nth SMS PDU to the C-SGN 306. In some implementations, the SM could come from numerous different SMS-C's.

At operation 11, when the C-SGN 306 receives the 1st SMS PDU from the SMSC 308, the C-SGN 306 sends Attach Accept including the SMS PDU as defined in 3GPP TS 23.040 to the UE 302 and an indication of the number of outstanding SM to be sent to the UE 302.

At operation 12, MO and MT SMS procedures following the procedures defined in TS 23.060 are performed while utilizing the small data transfer described other sections.

At operation 13, when the UE 302 has received the number of outstanding SM as identified in operation 11 from the C-SGN 306, the UE 302 shall send a Detach to the C-SGN 306.

Figure 6:
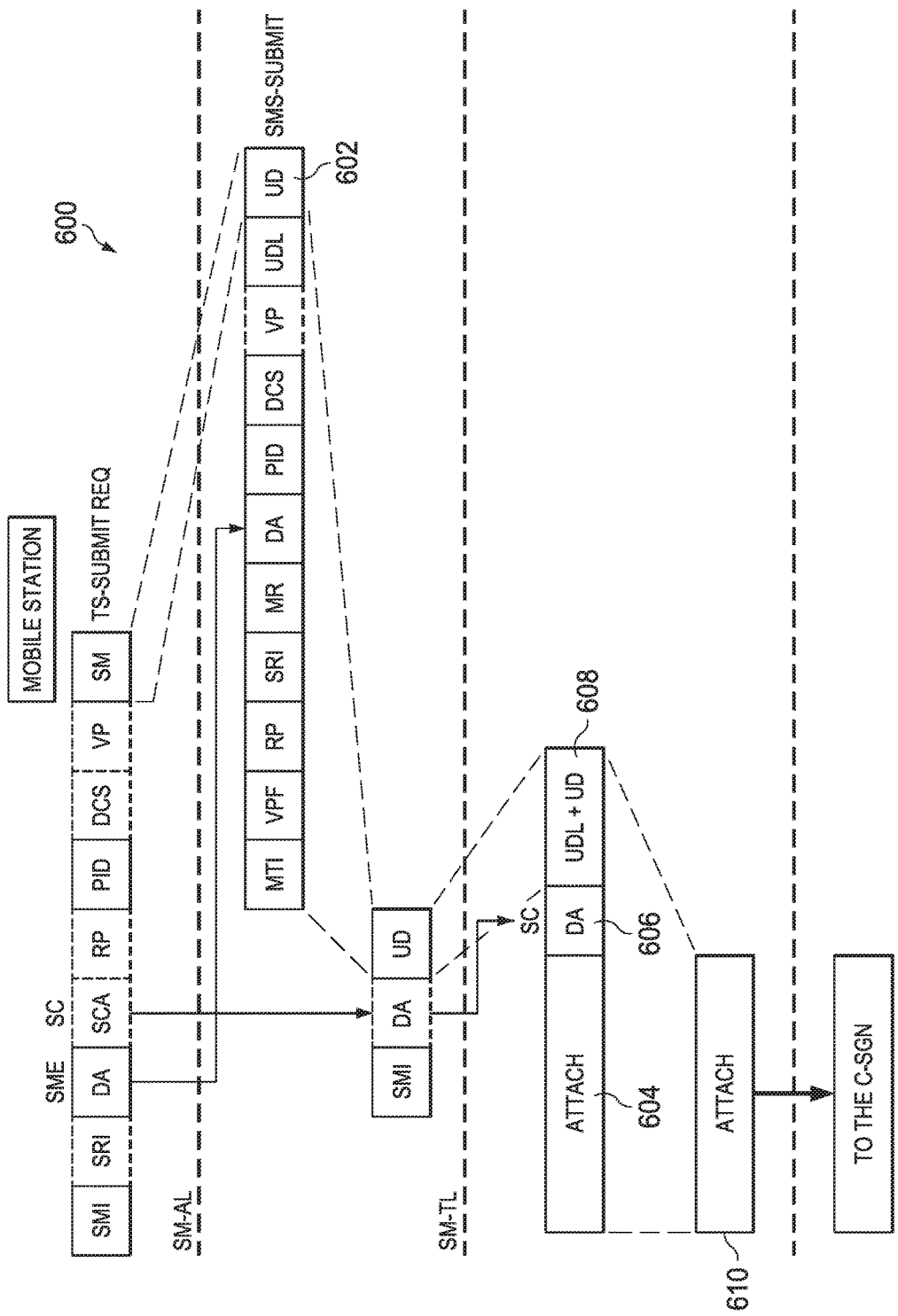
FIG. 6 is a schematic diagram illustrating an example process of a user equipment (UE) including mobile-originated data in a Message 1 according to an implementation.

FIG. 6 is a schematic diagram illustrating an example process 600 of a UE including mobile-originated data in a Message 1 according to an implementation. The Message 1 may be an attach request message. For example, the UE 102 includes the mobile-originated data in the field of user data (UD) 602 of an SMS-SUBMIT PDU, and further includes the SMS-SUBMIT PDU in the field of user data length (UDL) and UD 608 of the attach request message 610. The UE includes the SMSC address in the field of destination address (DA) 606 of the attach request message 610. The attach request message 610 to be sent to a network node 1 (e.g., C-SGN) also includes attach information 604.

Figure 7:
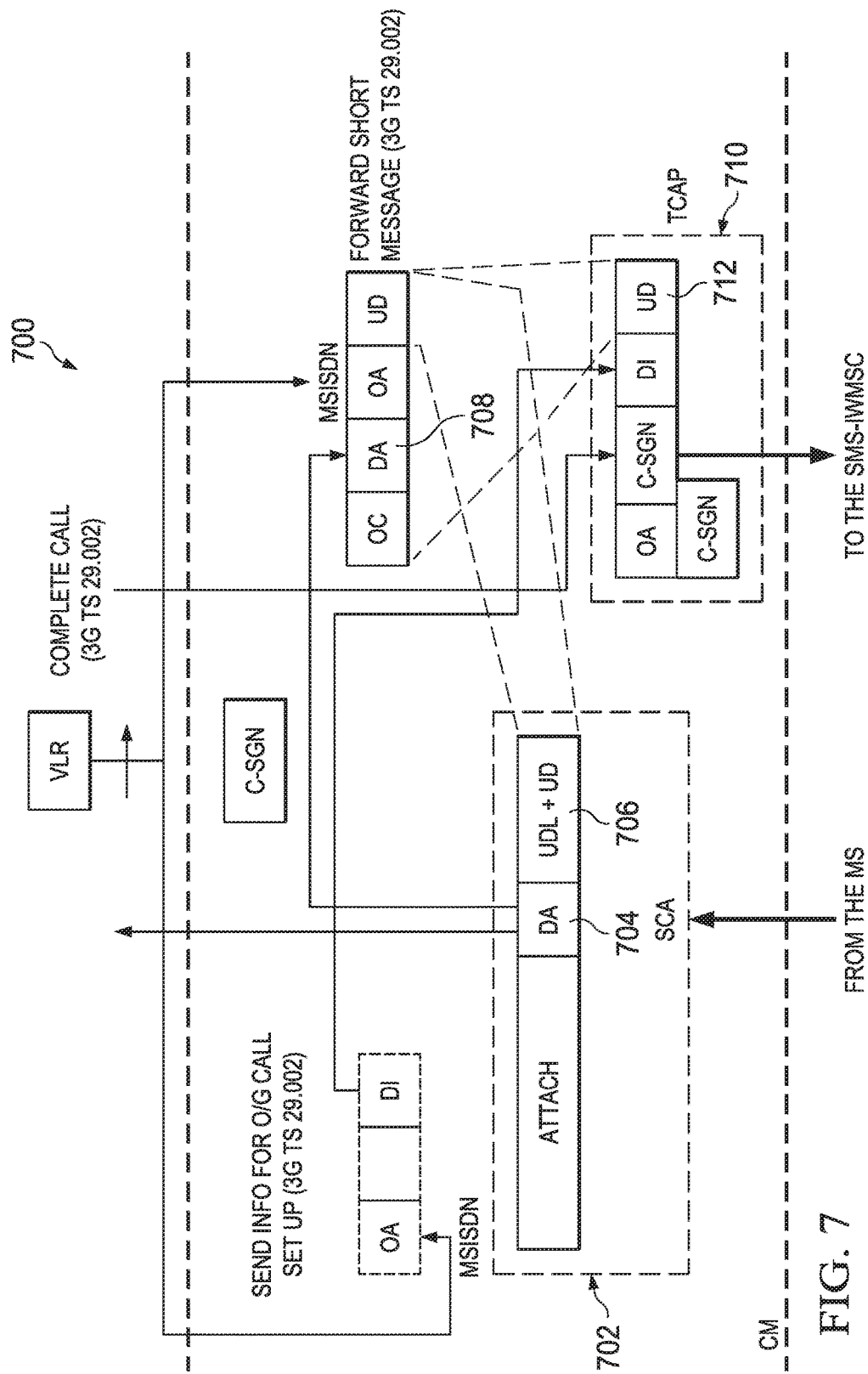
FIG. 7 is a schematic diagram illustrating an example process of a network node 1 extracting mobile-originated data from a Message 1 and including the data in a Message 7 according to an implementation.

FIG. 7 is a schematic diagram illustrating an example process 700 of a network node 1 extracting mobile-originated data from a Message 1 and including the data in a Message 7 according to an implementation. The network node 1 may be a C-SGN. The Message 1 may be an attach request message. The schematic diagram includes an attach request message 702 received from the UE and a Message 7 710 to be sent to a network node 3 (e.g., SMS-C). For example, the attach request message 702 received at the C-SGN includes the SMSC address included in the DA field 704 and the mobile-originated data included in the UDL and UD field 706. The C-SGN extracts the mobile-originated data from the attach request message 702 and includes the data in the UD field 712 of the Message 7 710. Message 7 710 also includes the SMSC address in the DA field 708 of the UD field 712.

Figure 8:
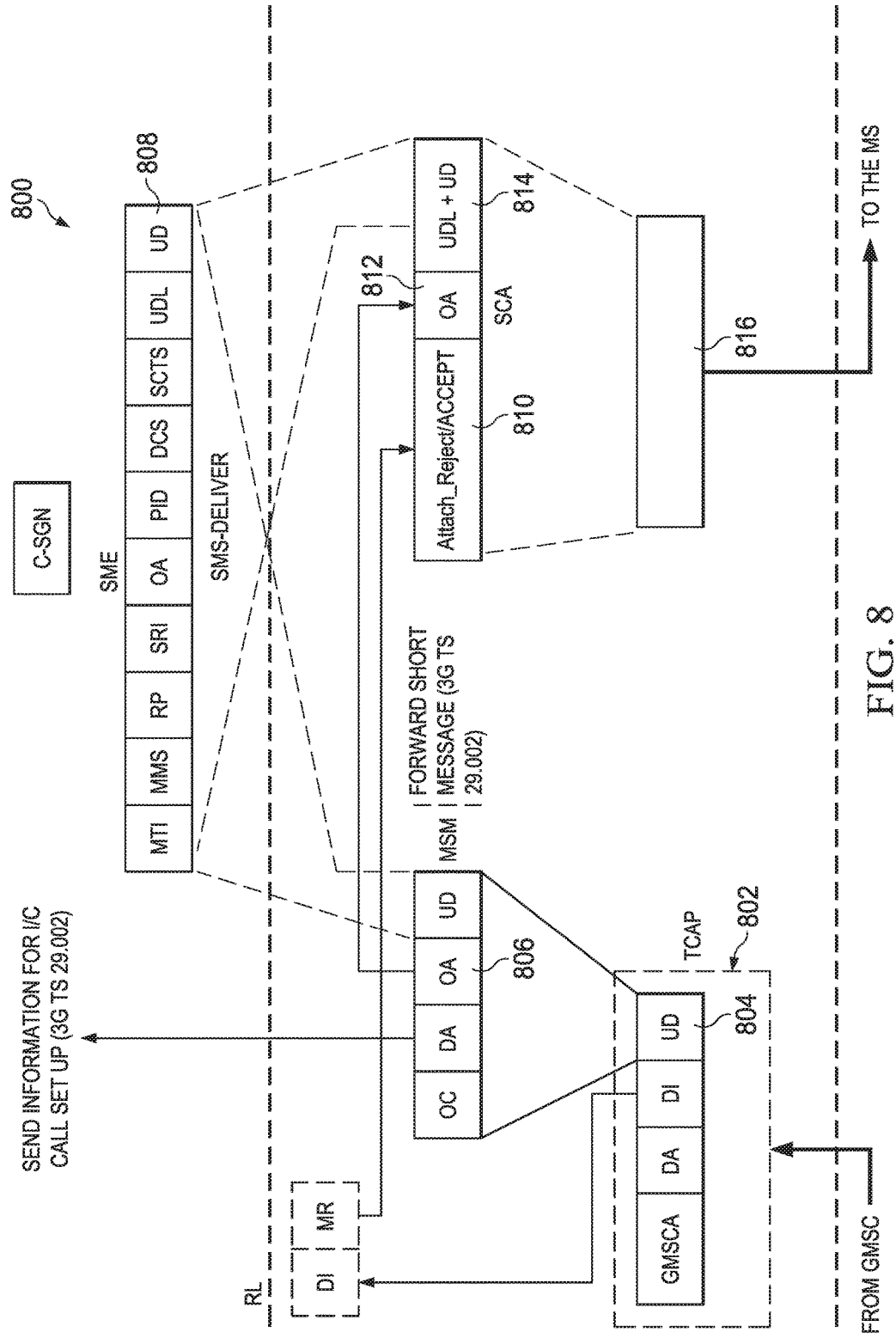
FIG. 8 is a schematic diagram illustrating an example process of a network node 1 extracting mobile-terminated data from a Message 3c and including the data in a Message 6 according to an implementation.

FIG. 8 is a schematic diagram illustrating an example process 800 of a network node 1 extracting mobile-terminated data from a Message 3c and including the data in a Message 6 according to an implementation. The network node 1 may be a C-SGN. The Message 6 may be an attach response message, which may be an attach reject or accept. The schematic diagram includes a Message 3c 802 received from a network node 3 (e.g., SMSC) and an attach response message 816 to be sent to the UE. For example, the Message 3c 802 received from the SMSC includes a UD field 804. The UD field 804 further includes an SMS-DELIVER PDU with the mobile-terminated data included in a UD field 808 of the SMS-DELIVER PDU. The C-SGN extracts the SMS-DELIVER PDU from the Message 3c 802 and includes the PDU in a UDL and UD field 814 of an attach response message 816. The C-SGN also includes the SMSC address in a field of originator address (OA) 812 of the attach response message 816. The C-SGN obtains the SMSC address from an OA field 806 of the UD field 804 in the Message 3c 802. The attach response message 816 also includes attach reject or accept information 810.

Figure 9:
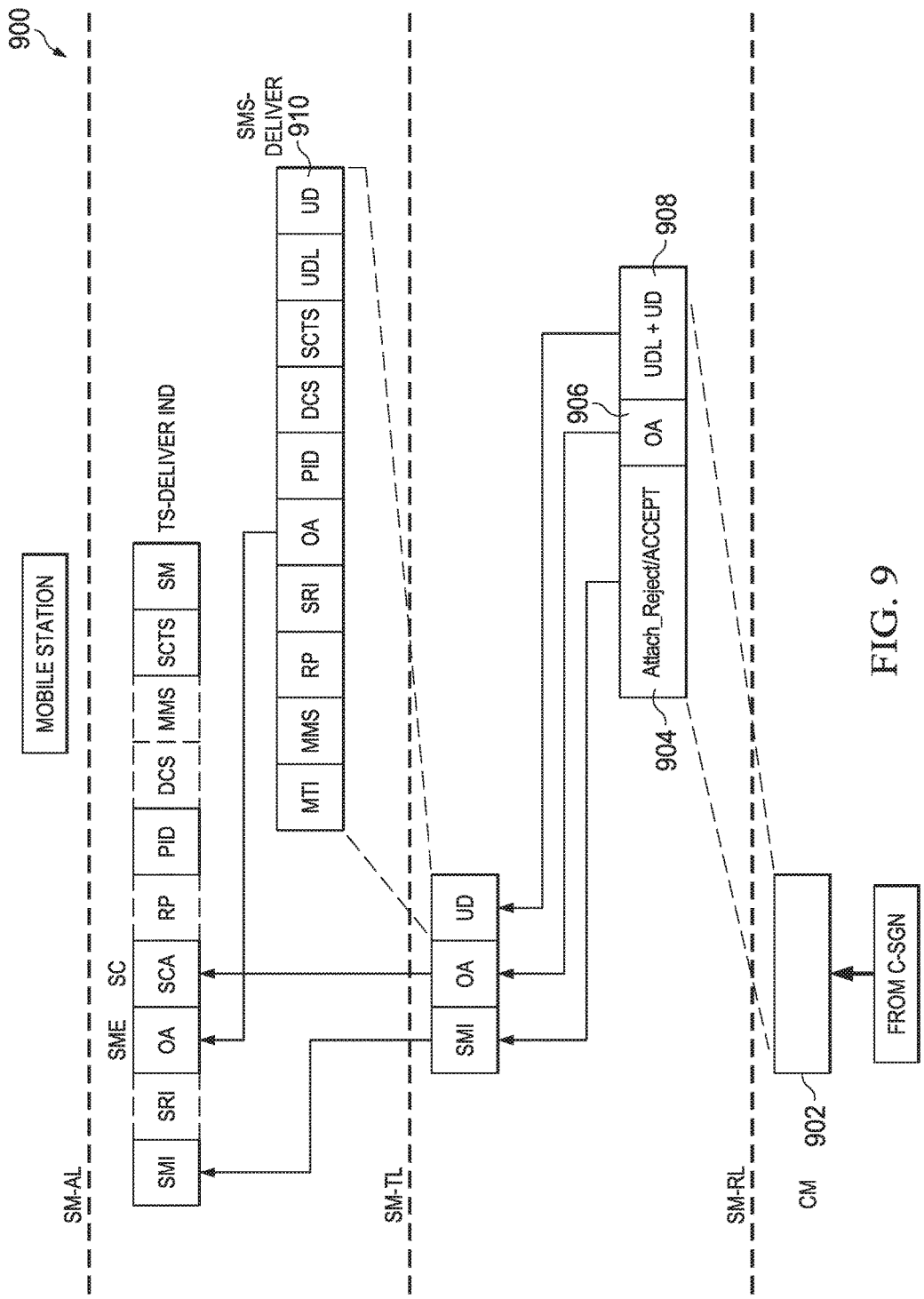
FIG. 9 is a schematic diagram illustrating an example process of a UE extracting mobile-terminated data from a Message 6 according to an implementation.

FIG. 9 is a schematic diagram illustrating an example process 900 of a UE extracting mobile-terminated data from a Message 6 according to an implementation. The Message 6 may be an attach response message, which may be an attach reject or accept. For example, the UE receives an attach response message 902 from a network node 1 (e.g., C-SGN). The attach response message 902 may include attach reject or accept information 904, the SMSC address in the OA field 906, and a UDL and UD field 908. The UDL and UD field 908 may further include an SMS-DELIVER PDU with the mobile-terminated data included in a UD field 910 of the SMS-DELIVER PDU. The UE extracts mobile-terminated data from the SMS-DELIVER PDU in the attach response message 902.

Figure 10:
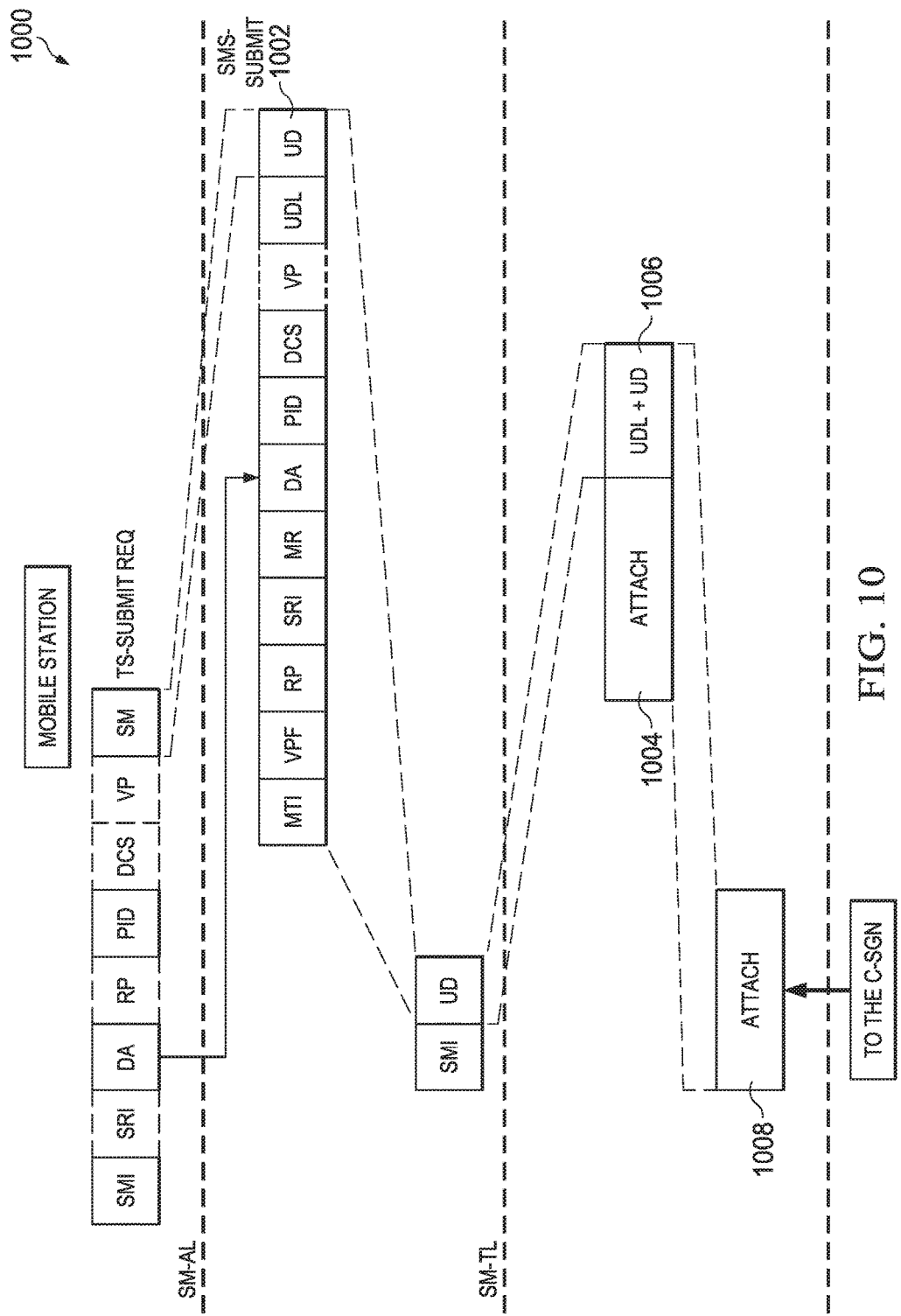
FIG. 10 is a schematic diagram illustrating an example process of a UE including mobile-originated data in a Message 1 without an SMS service center (SMSC) address according to an implementation.

FIG. 10 is a schematic diagram illustrating an example process 1000 of a UE including mobile-originated data in a Message 1 without an SMSC address according to an implementation. The Message 1 may be an attach request message. For example, the UE includes the mobile-originated data in the field of user data (UD) 1002 of an SMS-SUBMIT PDU, and further includes the SMS-SUBMIT PDU in the field of user data length (UDL) and UD 1006 of the attach request message 1008. The UE does not include an SMSC address in the attach request message

1008. The attach request message 1008 to be sent to a network node 1 (e.g., C-SGN) also includes attach information 1004.

Figure 11:
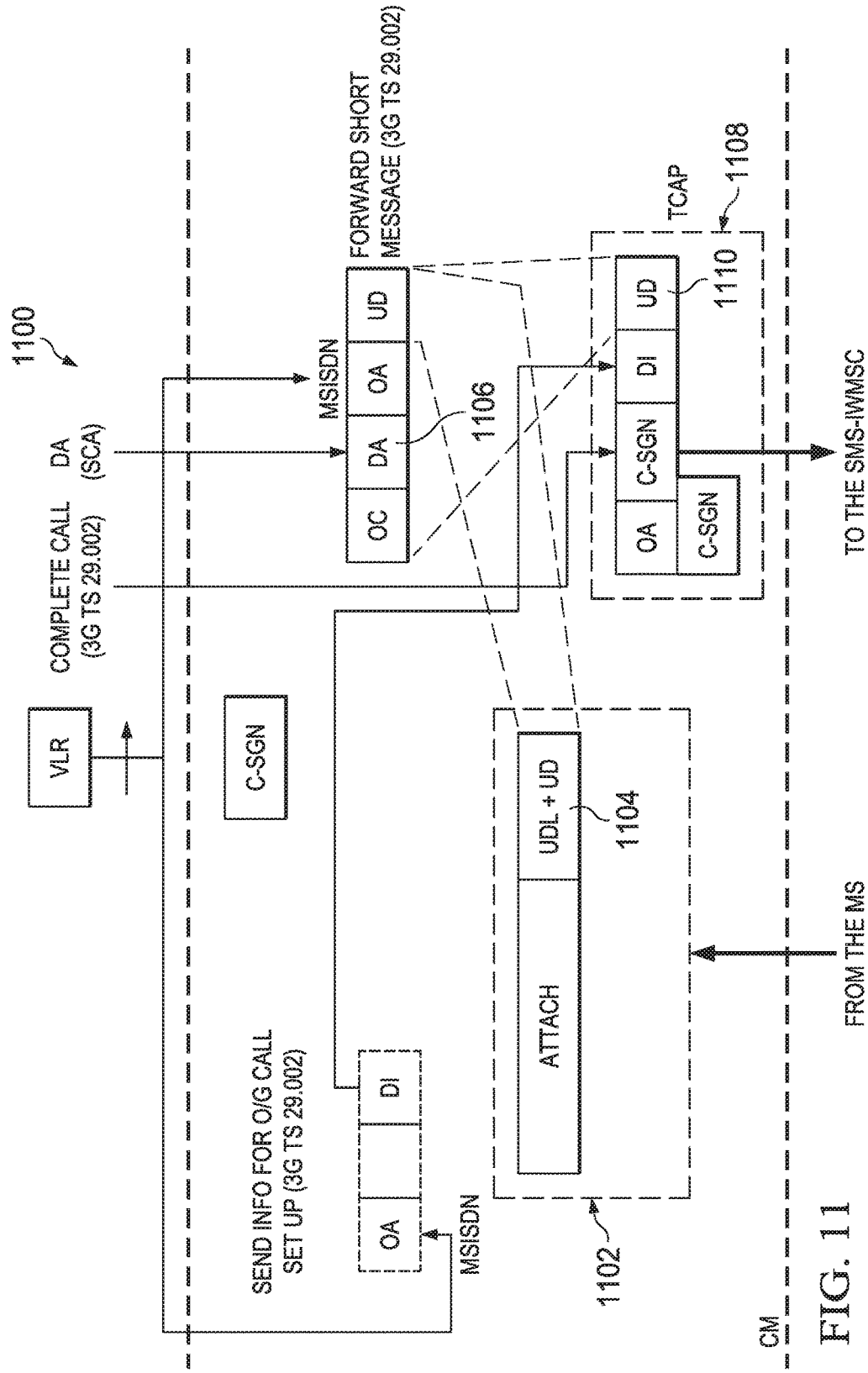
FIG. 11 is a schematic diagram illustrating an example process of a network node 1 extracting mobile-originated data from a Message 1 and including the data in a Message 7, without a UE providing an SMSC address, according to an implementation.

FIG. 11 is a schematic diagram illustrating an example process 1100 of a network node 1 extracting mobile-originated data from a Message 1 and including the data in a Message 7, without a UE providing an SMSC address, according to an implementation. The network node 1 may be a C-SGN. The Message 1 may be an attach request message. The schematic diagram includes an attach request message 1102 received from the UE and a Message 7 1108 to be sent to a network node 3 (e.g., SMSC). For example, the attach request message 1102 received at the C-SGN includes the mobile-originated data included in the UDL and UD field 1104. The C-SGN extracts the mobile-originated data from the attach request message 702 and includes the data in the UD field 1110 of the Message 7 1108. The attach request message 1102 does not include an SMSC address. The C-SGN may include the SMSC address that was received from Message 3e into Message 7 1108. For example, the SMSC address may be included in the DA field 1106 of the UD field 1110 of the Message 7 1108.

Figure 12:
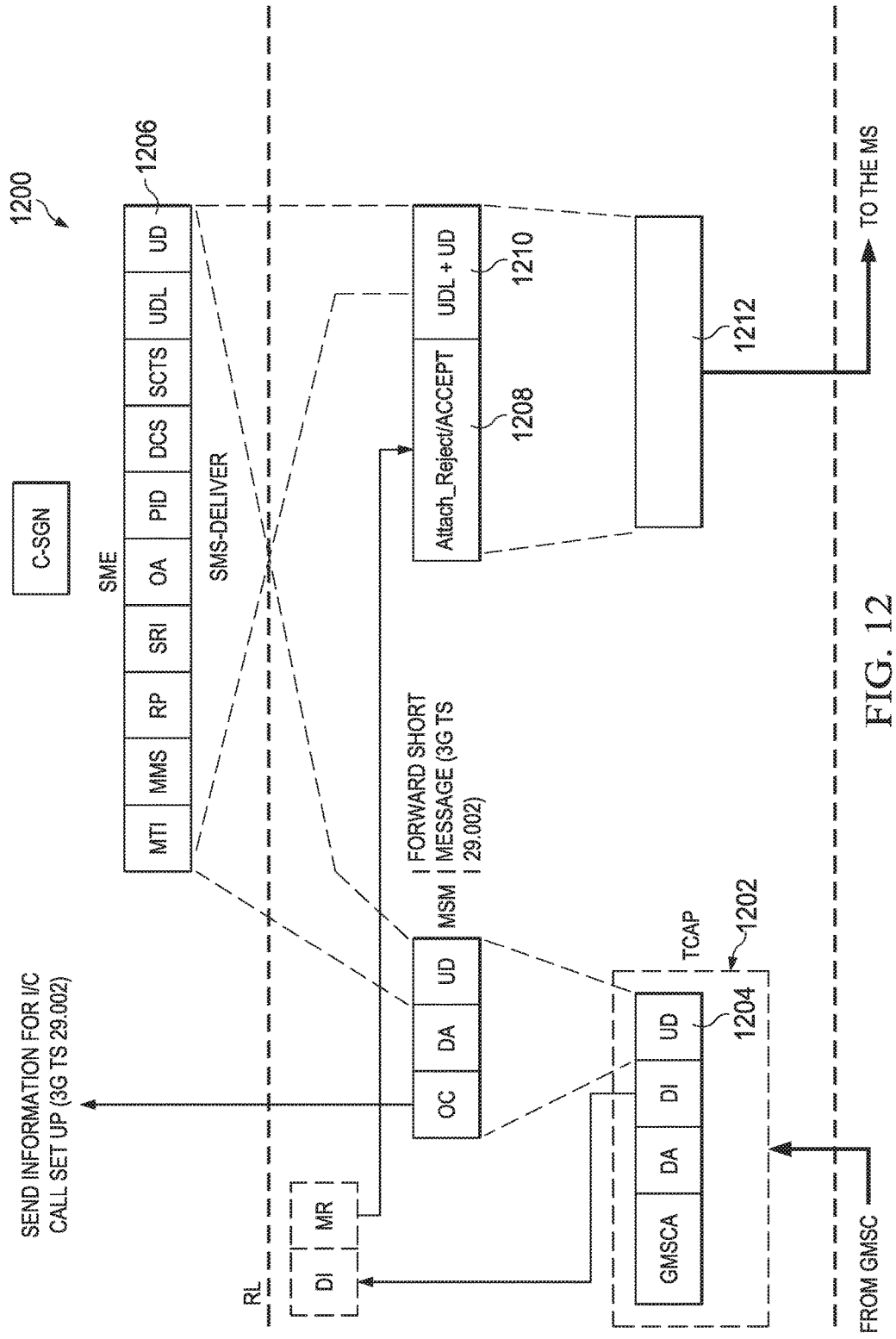
FIG. 12 is a schematic diagram illustrating an example process of a network node 1 extracting mobile-terminated data from a Message 3c and including the data in a Message 6 without an SMSC address, according to an implementation.

FIG. 12 is a schematic diagram illustrating an example process 1200 of a network node 1 extracting mobile-terminated data from a Message 3c and including the data in a Message 6 without a SMSC address, according to an implementation. The network node 1 may be a C-SGN. The Message 6 may be an attach response message, which may be an attach reject or accept. The schematic diagram includes a Message 3c 1202 received from a network node 3 (e.g., SMSC) and an attach response message 1212 to be sent to the UE. For example, the Message 3c 1202 received from the SMSC includes a UD field 1204. The UD field 1204 further includes an SMS-DELIVER PDU with the mobile-terminated data included in a UD field 1206 of the SMS-DELIVER PDU. The C-SGN extracts the SMS-DELIVER PDU from the Message 3c 1202 and includes the PDU in a UDL and UD field 1210 of an attach response message 1212. The C-SGN does not include an SMSC address in the attach response message 1212. The attach response message 1212 also includes attach reject or accept information 1208.

Figure 13:
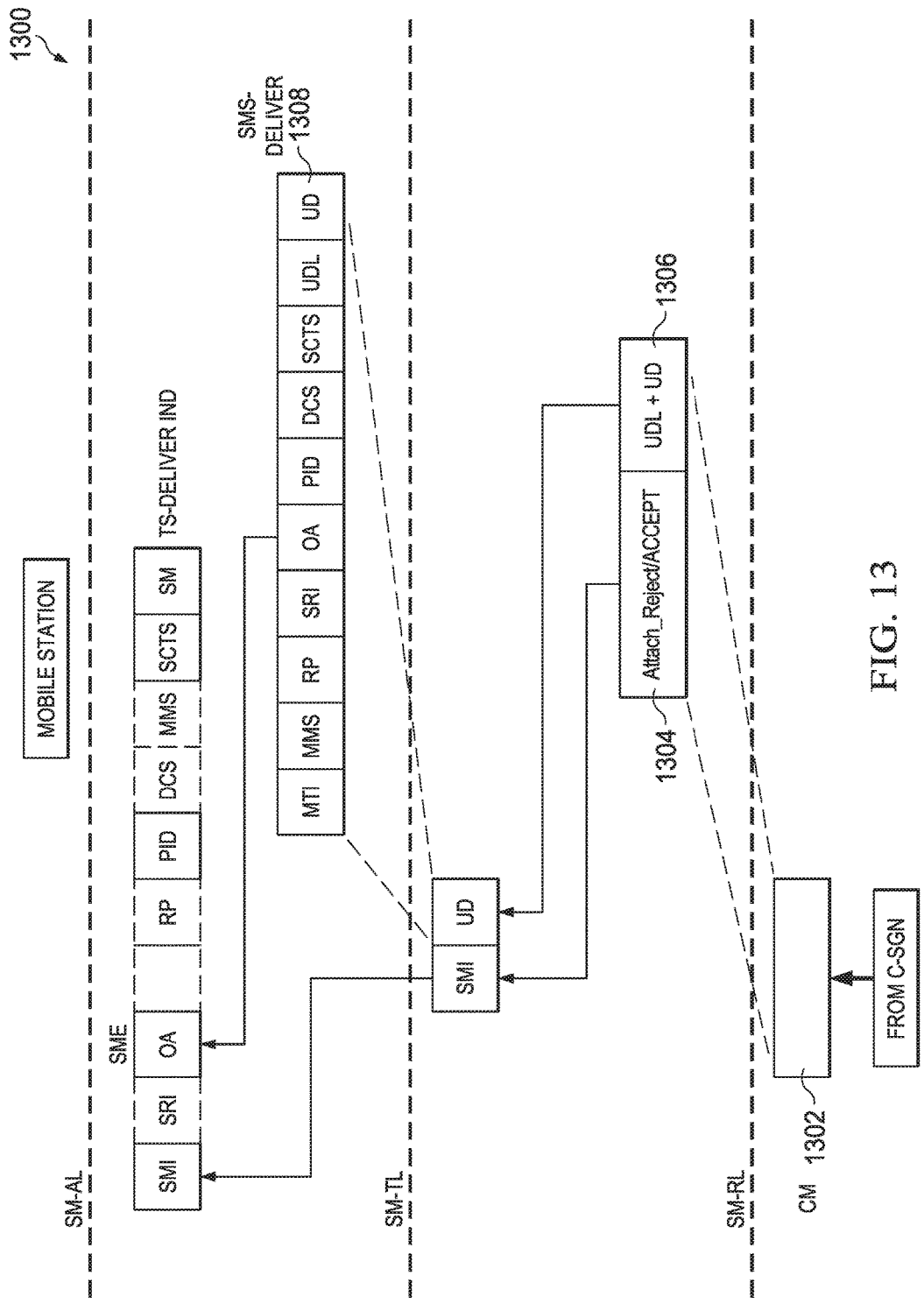
FIG. 13 is a schematic diagram illustrating an example process 1300 of a UE extracting mobile-terminated data from a Message 6 without an SMSC address according to an implementation.

FIG. 13 is a schematic diagram illustrating an example process 1300 of a UE extracting mobile-terminated data from a Message 6 without an SMSC address according to an implementation. The Message 6 may be an attach response message, which may be an attach reject or accept. For example, the UE receives an attach response message 1302 from a network node 1 (e.g., C-SGN). The attach response message 1302 may include attach reject or accept information 1304 and a UDL and UD field 1306. The UDL and UD field 1306 further include an SMS-DELIVER PDU with the mobile-terminated data included in a UD field 1308 of the SMS-DELIVER PDU. The UE extracts mobile-terminated data from the SMS-DELIVER PDU in the attach response message 1302. The attach response message 1302 does not include an SMSC address.

Figure 14:
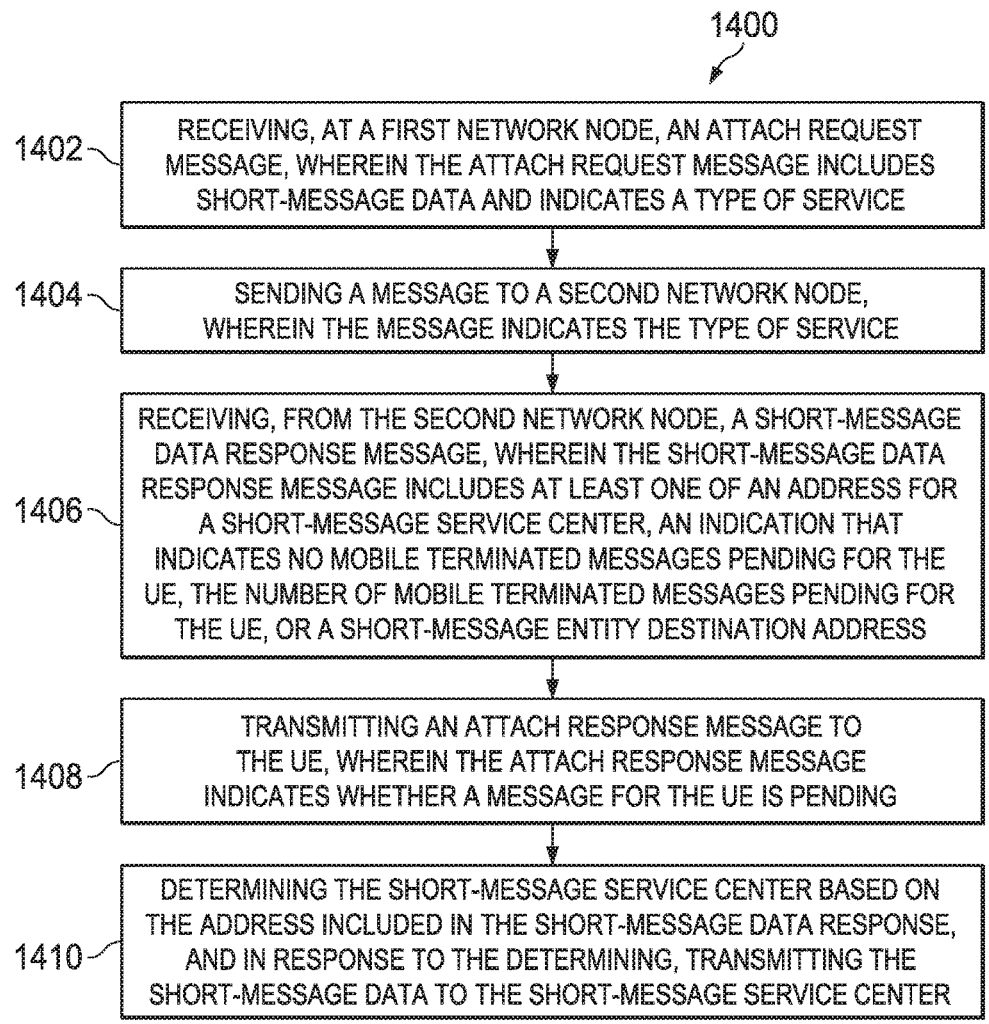
FIG. 14 is a flowchart illustrating an example method for using optimized short message transport to transfer data in a CIoT environment according to an implementation.

FIG. 14 is a flowchart illustrating an example method 1400 for using optimized short message transport to transfer data in a CIoT environment according to an implementation. The method 1400 may begin at block 1402, where the first network node receives an attach request message from a UE. The attach request message includes short-message data and indicates a type of service the UE requested. The short-message data is one or more PDUs that are at least one of an SMS-SUBMIT PDU, an SMS-COMMAND PDU, an SMS-DELIVER-REPORT PDU, or an SMS-SUBMIT-REPORT PDU. The type of data service may be one of but not limited to mobile origination, mobile termination, or mobile origination and termination. At block 1404, the first network node sends a message to a second network node and the message indicates the type of service the UE requested.

At block 1406, the first network node receives a short-message data response message from the second network node. The short-message data response message may include at least one of an address for a short message service center, an indication that indicates no mobile-terminated message is pending for the UE, the number of mobile-terminated messages pending for the UE, or a short-message entity destination address.

At block 1408, the first network node may transmit an attach response message to the UE. The attach response message may indicate whether a message for the UE is pending and/or the number of pending messages. The attach response message may also include the mobile-terminated message.

At block 1410, the first network node determines the short-message service center based on the address included in the short-message data response. In response to the determining, the first network node transmits the short-message data to the short-message service center.

Figure 15:
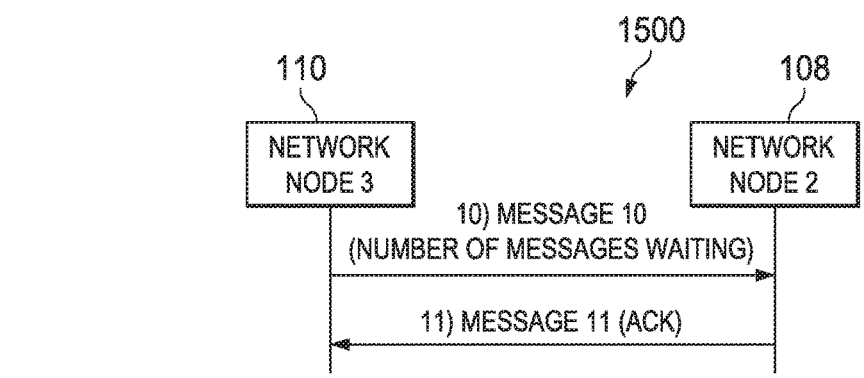
FIG. 15 is a data flow diagram illustrating an example process to notify a network node 2 of a number of mobile-terminated messages pending according to an implementation.

FIG. 15 is a data flow diagram illustrating an example process 1500 to notify a network node 2 of a number of mobile-terminated messages pending according to an implementation. The data flow diagram includes a network node 2 108 (e.g., HSS) and a network node 3 110 (e.g., SMSC).

At operation 10, if a mobile-terminated message cannot be delivered to the UE, the network node 3 110 may send a Message 10 to the network node 2 108. The Message 10 may include the identity of the UE (e.g., the private identity such as IMSI or GUTI or the public identity such as MSISDN or URI) and/or the number of pending messages to be delivered to the UE. Upon receiving the Message 10, the network node 2 may store the identity of the UE and/or the number of pending messages to be delivered. At operation 11, the network node 2 108 may send a Message 11 to the network node 3 110 to acknowledge the receipt of Message 10. In some implementations, the example process 1500 may occur when the UE is not connected to the network.

FIGS. 16A-16E illustrate a first example description of Evolved Packet System (EPS) mobility management (EMM) procedures according to an implementation. For example, the attach procedure in 3GPP TS 24.302 may include the following description when the UE attaches to the network for CIoT SMS services (also known as optimized short message transport):

If the UE is CIoT capable, the network is CIoT capable (see description below) and the UE wants to
  a) send a SM, then the UE shall send the ATTACH REQUEST message together with SMS-SUBMIT message as defined in 3GPP 23.040 [x] contained in the CIoT message container information element. The UE shall set the Attach type to "SMS MO".
  b) receive an SM, then the UE shall send the ATTACH REQUEST message. The UE shall set the Attach type to "SMS MT; or
  c) send and receive an SM, then the UE shall send the ATTACH REQUEST message together with SMS-SUBMIT message as defined in 3GPP 23.040 [x] contained in the CIoT message container information element. The UE shall set the Attach type to "SMS MO/MT".

FIGS. 17A-17F illustrate a second example description of EMM procedures according to an implementation. For example, the attach procedure in 3GPP TS 24.302 may include the following description of MME (i.e., the network node 1) behavior when an attach request of CIoT SMS services is accepted by the network:

If the attach request is accepted by the network, the MME shall send an ATTACH ACCEPT message to the UE and start timer T3450. If the UE indicated:

a) EPS attach, combined EPS/IMSI attach then the MME shall send the ATTACH ACCEPT message together with an ACTIVATE DEFAULT EPS BEARER CONTEXT REQUEST message contained in the ESM message container information element to activate the default bearer (see subclause 6.4.1). The network may also initiate the activation of dedicated bearers towards the UE by invoking the dedicated EPS bearer context activation procedure (see subclause 6.4.2).

b) SMS MO, the MME shall send an ATTACH REJECT message with
  i) If the UE indicated the Attach type to "SMS MO" and the CIoT message container information element contained SMS PDU as defined in 3GPP TS 23.040 [x], EMM cause code set to
    1) "Successful receipt of data" if there are no pending messages to be delivered to the UE; or
    2) "successful receipt of data, and pending messages to send" if there are pending messages to be delivered to the UE.
  ii) If the UE indicated the Attach type to "SMS MO" and the CIoT message container information element does not contain an SMS PDU as defined in 3GPP TS 23.040 [x] or the CIoT message contained information element is not present, EMM cause code set to
    1) "data not received" if there are no pending messages to be delivered to the UE; or
    2) "data not received and pending data to send" if there are pending messages to be delivered to the UE;

c) SMS MT the MME shall send ATTACH REJECT message with
  i) If the UE indicated the Attach type to "SMS MT", EMM cause code set to "no pending terminated messages to send" if there are no pending messages to be delivered to the UE.

d) SMS MT the MME shall send ATTACH ACCEPT message with:
  i) If the UE indicated the Attach type to "SMS MT" and, EMM cause code set to
    1) "no pending terminated messages" if there is a single SMS MT PDU as defined in 3GPP TS 23.040 [x] and include the SMS MT PDU as defined in 3GPP TS 23.040 [x] in the CIoT message container information element.
    2) "pending messages to send" if there are more than one SMS MT PDU as defined in 3GPP TS 23.040 [x] and include the first SMS MT PDU as defined in 3GPP TS 23.040 [x] in the CIoT message container information element.
    ALTERNATIVE TO d)2)
d) SMS MT the MME shall send ATTACH ACCEPT message with
  i) if there is a single SMS MT PDU as defined in 3GPP TS 23.040 [x] and include the SMS MT PDU as defined in 3GPP TS 23.040 [x] in the CIoT message container information element.
  ii) if there are more than one SMS MT PDU as defined in 3GPP TS 23.040 [x] and include
    1) the first SMS MT PDU as defined in 3GPP TS 23.040 [x] in the CIoT message container information element; and the Pending Messages information element with the number of pending messages to send.

e) SMS MO/MT the MME shall send an ATTACH REJECT message
  i) If the UE indicated the Attach type to "SMS MO/MT" and the CIoT message container information element contained SMS PDU as defined in 3GPP TS 23.040 [x], EMM cause code set to
    1) "Successful receipt of data" if there are no pending messages to be delivered to the UE; or
    ALTERNATIVE TO e)i1)
    1) "successful receipt of data, and no pending messages to send" if there are no pending messages to be delivered to the UE; or
  ii) If the UE indicated the Attach type to "SMS MO" and the CIoT message container information element does not contain an SMS PDU as defined in 3GPP TS 23.040 [x] or the CIoT message container information element is not present, EMM cause code set to
    1) "data not received" if there are no pending messages to be delivered to the UE;
    2) "data not received, pending messages to send" if there are pending messages to be delivered to the UE
    ALTERNATIVE TO e)ii1)
    1) "data not received, no pending messages to send" if there are no pending messages to be delivered to the UE;

f) SMS MO/MT the MME shall send an ATTACH ACCEPT message
  i) If the UE indicated the Attach type to "SMS MO/MT" and the CIoT message container information element contained SMS PDU as defined in 3GPP TS 23.040 [x], EMM cause code set to "Successful receipt of data" and if there
    1) is a single SMS MT PDU as defined in 3GPP TS 23.040 [x] include the SMS MT PDU as defined in 3GPP TS 23.040 [x] in the CIoT message container information element.
    2) if there are more than one SMS MT PDU as defined in 3GPP TS 23.040 [x] include the first SMS MT PDU as defined in 3GPP TS 23.040 [x] in the CIoT message container information element; and the Pending Messages information element with the number of pending messages to send FIG. 18 illustrates a third example description of EMM procedures according to an implementation. For example, the attach procedure in 3GPP TS 24.302 may include the following description of UE behavior upon the UE receiving an attach reject message:

The UE shall take the following actions depending on the EMM cause value received in the ATTACH REJECT message.

3 (Illegal UE);
6 (Illegal ME); or
. . .
XX (data not receive);
  The UE shall repeat the ATTACH procedure for CIoT device up to a maximum number of times.
XX (data not receive, no pending messages to send);
  The UE shall repeat the ATTACH procedure and UE shall set the Attach type to "SMS MO"
XX (data not received and pending data to send);

The UE shall repeat the ATTACH procedure and UE shall set the Attach type to "SMS MO/MT".

XX (successful receipt of data, and pending messages to send);

The UE shall repeat the ATTACH procedure and UE shall set the Attach type to "SMS MT"

FIGS. 19A and 19B illustrate an example description of an attach accept message according to an implementation. For example, the attach accept message in 3GPP TS 24.302 may include the following information elements (IEs):

TABLE 2

IEs in Attach Accept Message

| IEI | Information Element | Type/Reference | Presence | Format | Length |
|---|---|---|---|---|---|
| | CiOT Message | CIoT Message 9.9.3.XX | O | LV-E | 5-n |
| | EMM cause | EMM cause 9.9.3.9 | O | V | 1 |
| | Pending messages | Pending messages 9.9.3.YY | O | TV | 2 |

FIG. 20 illustrates an example description of an attach reject message according to an implementation. For example, the attach reject message in 3GPP TS 24.302 may include the following IE:

TABLE 3

IE in Attach Reject Message

| IEI | Information Element | Type/Reference | Presence | Format | Length |
|---|---|---|---|---|---|
| | CiOT Message | CioT Message 9.9.3.XX | O | LV-E | 5-n |

FIGS. 21A and 21B illustrate an example description of an attach request message according to an implementation. For example, the attach request message in 3GPP TS 24.302 may include the following IE:

TABLE 4

IEs in Attach Request Message

| IEI | Information Element | Type/Reference | Presence | Format | Length |
|---|---|---|---|---|---|
| | CiOT Message | CioT Message 9.9.3.XX | O | LV-E | 5-n |
| | Pending messages | Pending messages 9.9.3.YY | O | TV | 2 |

FIGS. 22A and 22B illustrate an example description of EMM cause according to an implementation. For example, the following causes may be included in 3GPP TS 24.302:

TABLE 5

EMM Causes successful receipt of data
no pending terminated messages
data not received
data not received, no pending messages to send
data not received, pending messages to send
Pending data to send
successful receipt of data, and pending messages to send
successful receipt of data, and no pending messages to send FIG. 23 illustrates an example description of EPS attach type according to an implementation. For example, the following EPS attach type may be included in 3GPP TS 24.302:

TABLE 6

EPS Attach Type Information Element
EPS attach type value (octet 1)

| Bits | | | |
|---|---|---|---|
| 3 | 2 | 1 | |
| 0 | 0 | 1 | EPS attach |
| 0 | 1 | 0 | combined EPS/IMSI attach |
| 1 | 1 | 0 | EPS emergency attach |
| 1 | 1 | 1 | reserved |

All other values are unused and shall be interpreted as "EPS attach", if received by the network.
Bit 4 of octet 1 When coded as 1 indicates attach type has been extended

TABLE 7

EPS Attach Type Value
EPS attach type value (octet 2)

| Bits | | | |
|---|---|---|---|
| 3 | 2 | 1 | |
| 0 | 0 | 1 | EPS attach for CioT |
| 0 | 1 | 0 | SMS data attach |
| 1 | 1 | 0 | reserved |
| 1 | 1 | 1 | reserved |

All other values are unused and shall be interpreted as "EPS attach for CioT", if received by the network.
Bit 4-8 of octet 2 spare and coded as zero Other values could be
1. SMS MO attach
2. SMS MT attach
3. SMS MO/MT attach FIG. 24 illustrates an example description of a CIoT message container according to an implementation. For example, the following description of the CIoT message container may be included in 3GPP TS 24.302:

CioT Message Container

This purpose of the CioT message container is to transfer of small data within an EMM message. The following IEI values are defined:

TABLE 8

CIOT Message Types for EPS Mobility Management

| Bits | | | | | | | | |
|---|---|---|---|---|---|---|---|---|
| 8 | 7 | 6 | 5 | 4 | 3 | 2 | 1 | |
| 0 | 1 | — | — | — | — | — | — | SMS message container |
| 1 | 0 | | | | | | | USSD message container |

FIG. 25 illustrates an example description of data message container IE according to an implementation. For example, the following description of the data message container IE may be included in 3GPP TS 24.302:

Data Message Container Information Element

The purpose of the Data message container information element is to enable transfer of a Data message within an EMM message e.g. SMS or USSD. SMS payload is defined within 3GPP TS 23.040. The SMS message included in this IE shall be coded as specified in subclause 8.3, i.e. without NAS security header.

The SMS message container information element is coded as shown below.

TABLE 9

| Data Message Container Information Element | | | | | | | | |
|---|---|---|---|---|---|---|---|---|
| 8 | 7 | 6 | 5 | 4 | 3 | 2 | 1 | |
| CIOT Message types for EPS mobility management container IEI | | | | | | | | octet 1 |
| Length of Data message container contents | | | | | | | | octet 2 |
| | | | | | | | | octet 3 |
| Data message container contents | | | | | | | | octet 4 |
| | | | | | | | | octet n |

TABLE 10

Description of Data Message Container Information Element

SMS message container contents (octet 4 to octet n); Max value of YYY octets
This IE can contain any SMS PDU as defined in 3GPP TS 23.040.

FIG. 26 illustrates an example description of pending messages IE according to an implementation. For example, the following description of pending messages IE may be included in 3GPP TS 24.302:
Pending Messages
  The purpose of this information element is to indicate the number of messages to be sent or received by the UE.

TABLE 11

| Pending Messages Information Element | | | | | | | | |
|---|---|---|---|---|---|---|---|---|
| 8 | 7 | 6 | 5 | 4 | 3 | 2 | 1 | |
| Pending message container IEI | | | | | | | | octet 1 |
| Number of pending messages | | | | | | | | octet 2 |

FIGS. 27A-27C illustrate an example description of MAP_SEND_AUTHENTICATION_INFO service according to an implementation. For example, the following service primitives of MAP_SEND_AUTHENTICATION_INFO service may be included in 3GPP TS 29.002:

TABLE 12

MAP_SEND_AUTHENTICATION_INFO Parameters

| Parameter name | Request | Indication | Response | Confirm |
|---|---|---|---|---|
| SMS only indicator | C | C(=) | | |
| Pending messages to send | | | C | C |

SMS Only Indicator
This parameter indicates if the UE has requested to attach for sending and/or receiving Short Messages.
OR
This parameter indicates if the UE has requested to attach for SMS.
Pending Messages to Send
This parameter shall be present if the HS S/HLR is aware of one or more Short Messages that are to be sent to the UE. This parameter shall be absent if the HSS/HLR is unaware of any Short Messages that are to be sent to the UE.
OR:
A number indicating how many Short Messages the UE shall be prepared to receive before performing a network detach.

FIGS. 28A-28C illustrate an example description of MAP_UPDATE_LOCATION service according to an implementation. For example, the following service primitives of MAP_UPDATE_LOCATION service may be included in 3GPP TS 29.002:

TABLE 13

MAP_UPDATE_LOCATION Parameters

| Parameter name | Request | Indication | Response | Confirm |
|---|---|---|---|---|
| SMS only indicator | C | C(=) | | |
| Pending messages to send | | | C | C |

SMS only indicator
This parameter indicates if the UE has requested to attach for sending and/or receiving Short Messages.
OR
This parameter indicates if the UE has requested to attach for SMS.
Pending Messages to Send
This parameter shall be present if the HS S/HLR is aware of one or more Short Messages that are to be sent to the UE. This parameter shall be absent if the HSS/HLR is unaware of any Short Messages that are to be sent to the UE.
OR:
A number indicating how many Short Messages the UE shall be prepared to receive before performing a network detach.

FIGS. 29A-29C illustrate an example description of MAP_UPDATE_GPRS_LOCATION service according to an implementation. For example, the following service primitives of MAP_UPDATE_GPRS_LOCATION service may be included in 3GPP TS 29.002:

TABLE 14

MAP_UPDATE_GPRS_LOCATION Parameters

| Parameter name | Request | Indication | Response | Confirm |
|---|---|---|---|---|
| SMS only indicator | C | C(=) | | |
| Pending messages to send | | | C | C |

SMS Only Indicator
This parameter indicates if the UE has requested to attach for sending and/or receiving Short Messages.
OR
This parameter indicates if the UE has requested to attach for SMS.
Pending Messages to Send
This parameter shall be present if the HSS/HLR is aware of one or more Short Messages that are to be sent to the UE. This parameter shall be absent if the HSS/HLR is unaware of any Short Messages that are to be sent to the UE.
OR:
A number indicating how many Short Messages the UE shall be prepared to receive before performing a network detach.

FIGS. 30A-30C illustrate an example description of MAP-INSERT-SUBSCRIBER-DATA service according to an implementation. For example, the following service primitives of MAP-INSERT-SUBSCRIBER-DATA service may be included in 3GPP TS 29.002:

TABLE 15

MAP-INSERT-SUBSCRIBER-DATA Parameter

| Parameter name | Request | Indication | Response | Confirm |
|---|---|---|---|---|
| Pending messages to send | | C | C(=) | |

Pending Messages to Send
This parameter shall be present if the HSS/HLR is aware of one or more Short Messages that are to be sent to the UE. This parameter shall be absent if the HSS/HLR is unaware of any Short Messages that are to be sent to the UE.
OR:
A number indicating how many Short Messages the UE shall be prepared to receive before performing a network detach.

FIGS. 31A and 31B illustrate an example description of MAP-REPORT-SM-DELIVERY-STATUS service according to an implementation. For example, the following service primitives of MAP-REPORT-SM-DELIVERY-STATUS service may be included in 3GPP TS 29.002:

TABLE 16

MAP-REPORT-SM-DELIVERY-STATUS Parameter

| Parameter name | Request | Indication | Response | Confirm |
|---|---|---|---|---|
| Pending messages to send | | C | C(=) | |

Pending Messages to Send
This parameter shall be present if the HSS/HLR is aware of one or more Short Messages that are to be sent to the UE. This parameter shall be absent if the HSS/HLR is unaware of any Short Messages that are to be sent to the UE.
OR:
A number indicating how many Short Messages the UE shall be prepared to receive before performing a network detach.

FIG. 32 illustrates an example description of mobile service data type according to an implementation. For example, the following description of mobile service data type may be included in 3GPP TS 29.002:

TABLE 17

SendAuthenticationInfoArg Description

```
SendAuthenticationInfoArg ::= SEQUENCE {
    imsi                              [0] IMSI,
    numberOfRequestedVectors          NumberOfRequestedVectors,
    segmentationProhibited            NULL                          OPTIONAL,
    immediateResponsePreferred        [1] NULL                      OPTIONAL,
    re-synchronisationInfo            Re-synchronisationInfo        OPTIONAL,
    extensionContainer                [2] ExtensionContainer        OPTIONAL,
    ...,
    requestingNodeType                [3] RequestingNodeType        OPTIONAL,
    requestingPLMN-Id                 [4] PLMN-Id                   OPTIONAL,
    numberOfRequestedAdditional-Vectors  [5] NumberOfRequestedVectors  OPTIONAL,
    additionalVectorsAreForEPS        [6] NULL                      OPTIONAL,
    sMS-OnlyIndicator                 [7] SMS-OnlyIndicator }
```

TABLE 18

SMS-OnlyIndicator Description

```
SMS-OnlyIndicator ::= ENUMERATED {
    MO       (0),
    Mt       (1),
    MOandMT  (3)
    ...
}
```

If the "Pending messages to send" IE is a simple flag/indicator:

TABLE 19

SendAuthenticationInfroRes Description with a Simple Flag of Pending Messages

```
SendAuthenticationInfoRes ::= [3] SEQUENCE {
    authenticationSetList      AuthenticationSetList        OPTIONAL,
    extensionContainer         ExtensionContainer           OPTIONAL,
    ...,
    eps-AuthenticationSetList  [2] EPS-AuthenticationSetList  OPTIONAL,
    pendingMessagesToSend      [3] NULL                       OPTIONAL }
```

If the "Pending messages to send" IE indicates the number of messages that are to be sent to the UE (e.g. as stored in the HSS/HLR):

TABLE 20

SendAuthenticationInfoRes Description with a Number of Pending Messages

```
SendAuthenticationInfoRes ::= [3] SEQUENCE {
    authenticationSetList      AuthenticationSetList        OPTIONAL,
    extensionContainer         ExtensionContainer           OPTIONAL,
    ...,
    eps-AuthenticationSetList  [2] EPS-AuthenticationSetList  OPTIONAL,
    pendingMessagesToSend      [3] PendingMessagesToSend      OPTIONAL }
```

TABLE 21

NumberOfPendingMessagesToSend Description

```
NumberOfPendingMessagesToSend ::= INTEGER
    (0..MaxNumberOfPendingMessagesToSend)
```

TABLE 22

| MaxNumberOfPendingMessagesToSend Description |
| --- |
| MaxNumberOfPendingMessagesToSend ::= 255 |

Figure 33:
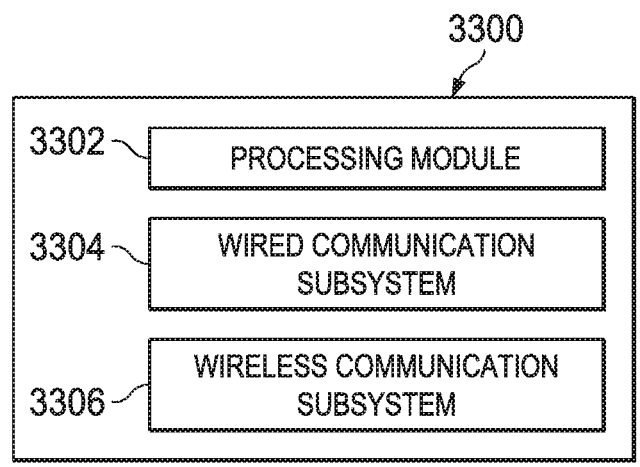
FIG. 33 is a schematic illustrating an example network node.

FIG. 33 is a schematic illustrating an example network node 3300. The example network node 3300 includes a processing module 3302, a wired communication subsystem 3304, and a wireless communication subsystem 3306. The processing module 3302 can include one or more processing components (alternatively referred to as "processors" or "central processing units" (CPUs)) operable to execute instructions associated with managing inter-device communications. The processing module 3302 can also include other auxiliary components, such as random access memory (RAM), read-only memory (ROM), secondary storage (for example, a hard disk drive or flash memory). The processing module 3302 can execute certain instructions and commands to provide wireless or wired communication, using the wired communication subsystem 3304 or a wireless communication subsystem 3306. A skilled artisan will readily appreciate that various other components can also be included in the example network node 3300.

Figure 34:
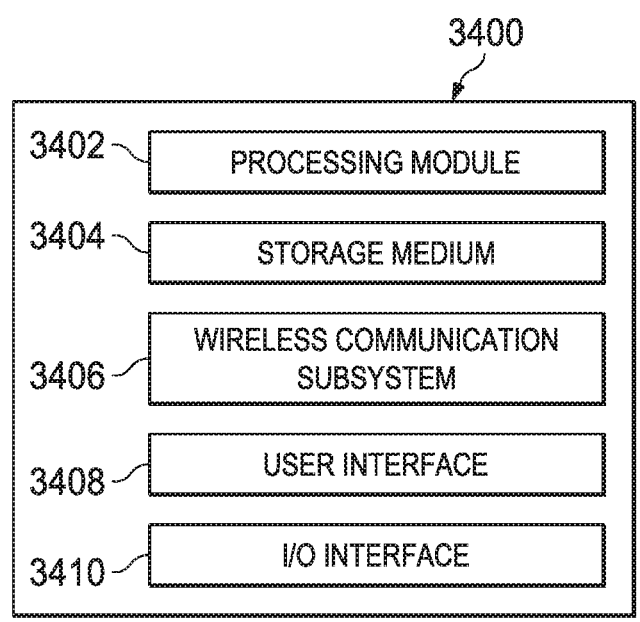
FIG. 34 is a schematic illustrating an example user equipment device.

FIG. 34 is a schematic illustrating an example UE apparatus. The example UE 3400 includes a processing unit 3402, a computer-readable storage medium 3404 (for example, ROM or flash memory), a wireless communication subsystem 3406, an interface 3408, and an I/O interface 3410. The wireless communication subsystem 3406 may be configured to provide wireless communications for data information or control information provided by the processing unit 3402. The wireless communication subsystem 3406 can include, for example, one or more antennas, a receiver, a transmitter, a local oscillator, a mixer, and a digital signal processing (DSP) unit. The interface 3408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 3410 can include, for example, a universal serial bus (USB) interface. A skilled artisan will readily appreciate that various other components can also be included in the example UE device 3400.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

What is claimed is:

1. A method, comprising:
   receiving, at a user equipment (UE), from a network, an indication indicating that the network supports optimized short message transport, wherein optimized short message transport comprises transmitting data in short messages using an attach procedure; and
   transmitting, from the UE, an attach request message to the network, wherein the attach request message indicates that the attach request message is for cellular Internet of Things (CIoT) data transmission, and the attach request message includes a data message container.

2. The method of claim 1, wherein the data message container includes one or more Protocol Data Units (PDUs) that are at least one of a short-message service (SMS)-SUBMIT PDU, an SMS-COMMAND PDU, an SMS-DELIVER-REPORT PDU, or an SMS-SUBMIT-REPORT PDU.

3. The method of claim 1, wherein the attach request message indicates a type of service for CIoT data transmission.

4. The method of claim 1, wherein the attach request message indicates that the UE requests not to transition to a connected mode.

5. The method of claim 1, further comprising:
   receiving an attach response message, wherein the attach response message indicates whether there is a mobile-terminated message for the UE is pending.

6. The method of claim 1, wherein the data message container includes CIoT data.

7. The method of claim 1, wherein the attach request message is transmitted in response to receiving the indication.

8. A user equipment (UE), comprising:
   at least one hardware processor; and
   a non-transitory computer-readable storage medium coupled to the at least one hardware processor and storing programming instructions for execution by the at least one hardware processor, wherein the programming instructions, when executed, cause the UE to perform operations comprising:
     receiving, from a network, an indication indicating that the network supports optimized short message transport, wherein optimized short message transport comprises transmitting data in short messages using an attach procedure; and
     transmitting an attach request message to the network, wherein the attach request message indicates that the attach request message is for cellular Internet of Things (CIoT) data transmission, and the attach request message includes a data message container.

9. The UE of claim 8, wherein the attach request message is transmitted in response to receiving the indication.

10. The UE of claim 8, wherein the data message container includes CIoT data.

11. The UE of claim 10, wherein the CIoT data is one or more Protocol Data Units (PDUs) that are at least one of a short-message service (SMS)-SUBMIT PDU, an SMS-COMMAND PDU, an SMS-DELIVER-REPORT PDU, or an SMS-SUBMIT-REPORT PDU.

12. The UE of claim 8, wherein the attach request message indicates a type of service for CIoT data transmission.

13. The UE of claim 8, wherein the attach request message indicates that the UE requests not to transition to a connected mode.

14. The UE of claim 8, the operations further comprising: receiving an attach response message, wherein the attach response message indicates whether there is a mobile-terminated message pending for the UE.

15. A non-transitory computer-readable medium storing instructions which, when executed, cause a computing device to perform operations comprising;
receiving, at a user equipment (UE), from a network, an indication indicating that the network supports optimized short message transport, wherein optimized short message transport comprises transmitting data in short messages using an attach procedure; and
transmitting, from the UE, an attach request message to the network, wherein the attach request message indicates that the attach request message is for cellular Internet of Things (CIoT) data transmission, and the attach request message includes a data message container.

16. The non-transitory computer-readable medium of claim 15, wherein the attach request message is transmitted in response to receiving the indication.

17. The non-transitory computer-readable medium of claim 15, wherein the data message container includes CIoT data.

18. The non-transitory computer-readable medium of claim 17, wherein the CIoT data is one or more Protocol Data Units (PDUs) that are at least one of a short-message service (SMS)-SUBMIT PDU, an SMS-COMMAND PDU, an SMS-DELIVER-REPORT PDU, or an SMS-SUBMIT-REPORT PDU.

19. The non-transitory computer-readable medium of claim 15, wherein the attach request message indicates a type of service for CIoT data transmission.

20. The non-transitory computer-readable medium of claim 15, wherein the attach request message indicates that the UE requests not to transition to a connected mode.

21. The method of claim 1, wherein the indication is received explicitly via a broadcast message or implicitly based on a radio access technology (RAT) used by the network.

22. The UE of claim 8, wherein the indication is received explicitly via a broadcast message or implicitly based on a radio access technology (RAT) used by the network.

23. The non-transitory computer-readable medium of claim 15, wherein the indication is received explicitly via a broadcast message or implicitly based on a radio access technology (RAT) used by the network.

* * * * *